United States Patent
Chikahisa et al.

(10) Patent No.: US 9,027,002 B2
(45) Date of Patent: May 5, 2015

(54) METHOD OF CONVERTING SOURCE CODE AND SOURCE CODE CONVERSION PROGRAM

(75) Inventors: Masaki Chikahisa, Fujisawa (JP); Makoto Ichii, Fujisawa (JP); Hideto Noguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 61 days.

(21) Appl. No.: 13/876,771

(22) PCT Filed: Oct. 25, 2011

(86) PCT No.: PCT/JP2011/074595
§ 371 (c)(1),
(2), (4) Date: Jun. 10, 2013

(87) PCT Pub. No.: WO2012/057170
PCT Pub. Date: May 3, 2012

(65) Prior Publication Data
US 2013/0263092 A1    Oct. 3, 2013

(30) Foreign Application Priority Data

Oct. 27, 2010 (JP) ................................. 2010-240775

(51) Int. Cl.
G06F 9/44 (2006.01)
G06F 11/36 (2006.01)

(52) U.S. Cl.
CPC ........ *G06F 11/3608* (2013.01); *G06F 11/3604* (2013.01); *G06F 11/3624* (2013.01)

(58) Field of Classification Search
CPC ... G06F 8/40; G06F 11/3604; G06F 11/3608; G06F 11/3624

USPC .......................... 717/104–109, 136–137, 126
See application file for complete search history.

(56) References Cited

U.S. PATENT DOCUMENTS

| | | | |
|---|---|---|---|
| 6,353,896 B1 | 3/2002 | Holzmann et al. | |
| 7,519,957 B2* | 4/2009 | Keidar-Barner et al. | 717/127 |
| 8,020,153 B2* | 9/2011 | Aoshima et al. | 717/126 |
| 2001/0037492 A1* | 11/2001 | Holzmann | 717/4 |
| 2006/0015858 A1 | 1/2006 | Tanimoto et al. | |

(Continued)

FOREIGN PATENT DOCUMENTS

| JP | 2000-181750 A | 6/2000 |
|---|---|---|
| JP | 2010-026704 A | 2/2010 |

(Continued)

OTHER PUBLICATIONS

Holzmann et al., "Software Model Checking—Extracting Verification Models from Source Code", 1999, Bell Laboratories, Lucent Technologies, 18 pages.*

(Continued)

*Primary Examiner* — Ted T Vo
(74) *Attorney, Agent, or Firm* — Volpe and Koenig, P.C.

(57) ABSTRACT

A method of converting a source code for converting a source code of software to an inspection code by using a computer, including the steps of: inputting a source code of software; inputting a plurality of different conversion rules; inputting a nonfunctional rule that is a constraint relating to process performance; and converting the source code to a nonfunctional inspection code written in an input language of a validation tool by the plurality of different conversion rules and the nonfunctional rule.

14 Claims, 16 Drawing Sheets

(56) References Cited

U.S. PATENT DOCUMENTS

2009/0307664 A1     12/2009    Huuck et al.
2013/0239098 A1*    9/2013    Ichii et al. .................... 717/137

FOREIGN PATENT DOCUMENTS

| | | |
|---|---|---|
| JP | 2010-504572 A | 2/2010 |
| JP | 2010-140408 A | 6/2010 |
| WO | 2004-038620 A1 | 5/2004 |

OTHER PUBLICATIONS

Holzmann, "Software Model Checking", 2003, retrieved from https://web.archive.org/web/20030726010921/http://spinroot.com/spin/Doc/marktoberdorf.pdf, 42 pages.*

Gerald J. Holzmann, "The SPIN Model Checker: Primer and Reference Manual", Addison-Wesley Professional, 2003, ISBN: 978-0321228628.

Object Management Group, "Meta Object Facility (MOF) Core Specification", formal/Jan. 1, 2006, Jan. 2006, http://www.omg.org/spec/MOF/2.0/PDF.

Object Management Group, "Meta Object Facility (MOF) 2.0 Query/View/Transformation Specification", formal/Apr. 3, 2008, Apr. 2008, http://www.omg.org/spec/QVT/1.0/PDF.

Object Management Group, "Object Constraint Language", formal/May 1, 2006, May 2006, ttp://www.omg.org/spec/OCL/2.0/PDF.

Behrmann et al., "A Tutorial on Uppaal", Formal Methods for the Design of Real-Time Systems Lecture Notes in Computer Science, 2004, vol. 3185/2004.

Aoki et al., "Development and Practice of Program Defect Detecting Work Supporting Tool Based on Model Checking", 2P-3 Information Processing Society of Japan 50th Anniversary 72nd National Convention of IPSJ, 2010,03,08, 1-4631~1-464.

Object Management Group, "MOF Model to Text Transformation Language, v1.0", formal/Jan. 16, 2008, Jan. 2008, http://www.omg.org/spec/MOFM2T/1.0/PDF.

* cited by examiner

NONFUNCTIONAL CONSTRAINT = TIME
CONVERSION RULE (PC)

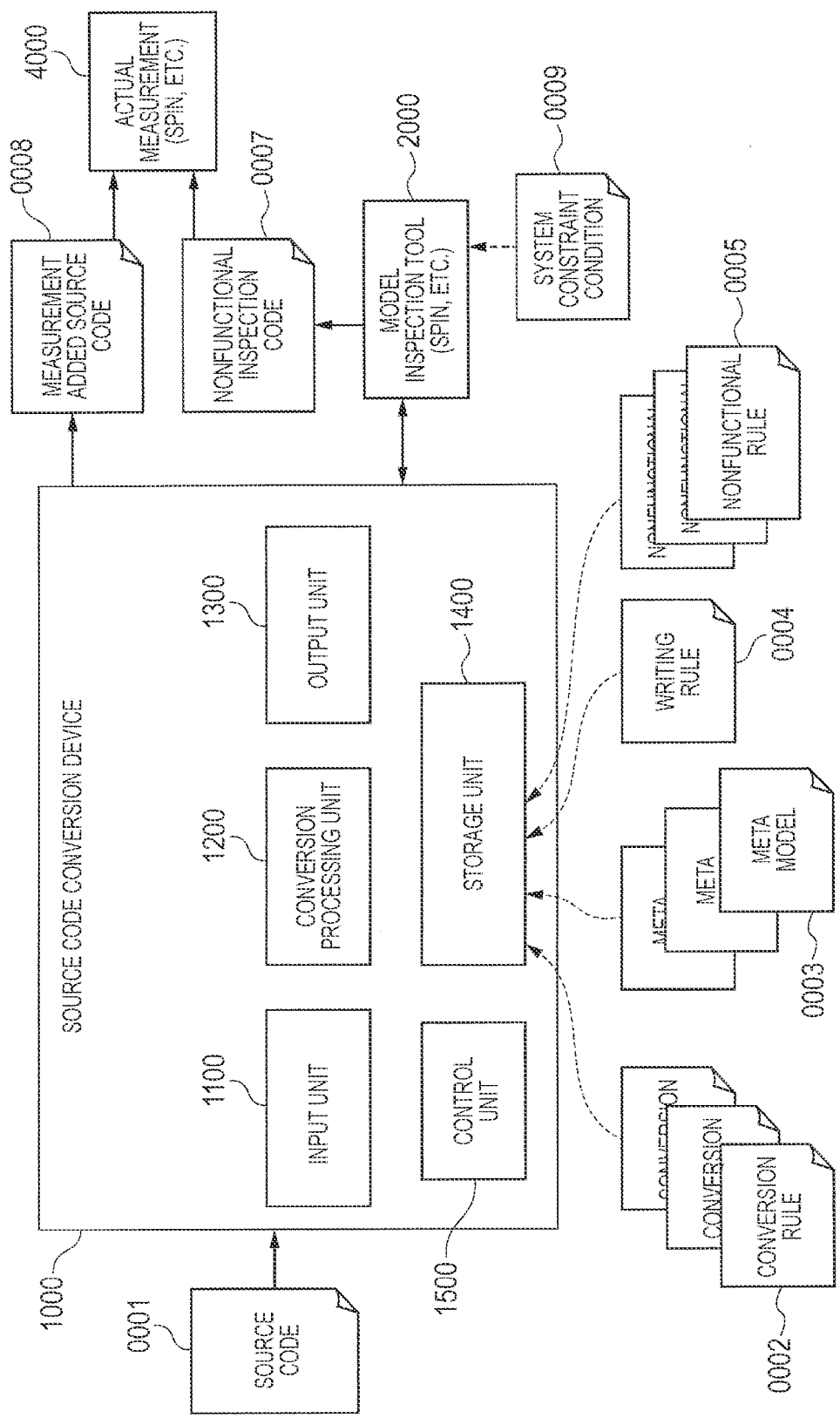

METHOD OF CONVERTING SOURCE CODE AND SOURCE CODE CONVERSION PROGRAM

TECHNICAL FIELD

The present invention relates to a method of converting a source code and a program of converting a source code, and particularly, to a technology that can validate nonfunction, that is, process performance of a system (software) when converting a source code of software into an inspection code by using a computer, in model checking of software.

BACKGROUND ART

In recent years, a software system penetrates a general society, and reliability required for software becomes very high, while software has gotten more complex and bigger, and thus it is very difficult to secure quality by review in a manual work or a test.

A model checking technique as a method disclosed in for example, Non-patent Literature 1, is a technique that writes a behavior of software with an input language of a predetermined model checker and executes the predetermined model checker to comprehensively inspect a state which the software may take such as whether a property required for the software is satisfied. According to the method disclosed in Non-patent Literature 1, a functional property which the software needs to satisfy is inspected by writing a behavior of software with an input language called Promela and inputting the written behavior in a model checker called SPIN.

Further, according to a method disclosed in Non-patent Literature 6, a behavior of software and a time constraint are expressed as a timed automaton and input into a model checker called UPPAAL to inspect a process time which the software needs to satisfy.

The model checking technique is a technique which is promising to secure quality of software which has gotten more complex and bigger, but comprehensively inspects the state which software may take, and thus a phenomenon called a state explosion in which the number of states to be inspected is enormous occurs, and both or any one of a phenomenon, in which a time calculation amount required for processing becomes a realistically unallowable size, and a phenomenon, in which a space calculation amount required for processing exceeds a storage region mounted on a computer used in processing, occur, in large-scale software, and as a result, the inspection may not be completed.

In order to cope with the state explosion, processing called abstraction is performed with respect to a source code or an inspection code, and as a result, the number of states may be reduced to an inspectable range. The abstraction includes simplification of a branching condition of, for example, a selection statement. Since an execution path which was not present originally may be generated or an execution path which is present may be extinct by the abstraction, a property of software expressed by an inspected result for the inspection code may be different from an original software property. Therefore, it is preferable to examine a level of the abstraction by considering a property to be inspected with respect to software and then apply the abstraction.

Further, the model inspection technique may have a practical problem in that an effort to write software to be inspected with an input language of a predetermined model checker is large. In the method disclosed in Patent Literature 1, the source code is converted into the inspection code written in an input language of a predetermined model checker by using a translation map. The inspection code is inspected by the predetermined model checker by using an environment model defined by a user apart from the conversion. In addition, according to the method disclosed in Patent Literature 2, the source code is converted into an intermediate expression, and a parameter to satisfy a real-time constraint is generated to generate a timed automaton added with the parameter.

FIG. 15 illustrates one example of a model checking technique using a computer in the related art. In a model checking system in the related art, first, a design is modeled and thereafter, a timed automaton which conforms to an execution environment is prepared and automatic inspection is performed. By the automatic inspection, comprehensive performance validation for software to be inspected is achieved.

Further, as one of software development technologies, model-driven development is used. The model driven development is a technology of performing software development by describing design information of software as a model and refining the model by a converting operation. For example, in the model driven development, a format or a meaning of a model is defined by a meta model written in an MOF which is a method disclosed in Non-patent Literature 2, a conversion rule of refining a model is written in a QVT which is a method disclosed in Non-patent Literature 3, description and validation by a constraint associated with consistency or soundness by a model are performed by an OCL which is a method disclosed in Non-patent Literature 4, and a source code is generated from a model by a MOFM2T which is a method disclosed in Non-patent Literature 5.

Further, a "model" in the model checking technique and a "model" in the model driven development are concepts that are independent from each other, and there is generally no commonality associated with a data structure or a meaning.

CITATION LIST

Patent Literature

Patent Literature 1: Japanese Patent Application Laid-Open Publication No. 2000-181750
Patent Literature 2: WO 2004/038620
Non-patent Literature 1: Gerard J. Holzmann, "The SPIN Model Checker: Primer and Reference Manual", Addison-Wesley Professional, 2003, ISBN: 978-0321228628
Non-patent Literature 2: Object Management Group, "Meta Object Facility (MOF) Core Specification", formal/2006-06-01, January 2006
Non-patent Literature 3: Object Management Group, "Meta Object Facility (MOF) 2. 0 Query/View/Transformation Specification", formal/2008-04-03, April 2008
Non-patent Literature 4: Object Management Group, "Object Constraint Language", formal/2006-05-01, May 2006
Non-patent Literature 5: Object Management Group, "MOF Model to Text Transformation Language, v1.0", formal/2008-01-16, January 2008
Non-patent Literature 6: Gerd Behrmann, Alexandre David and Kim G. Larsen, "A Tutorial on Uppaal", Formal Methods for the Design of Real-Time Systems Lecture Notes in Computer Science, 2004, Volume 3185/2004

SUMMARY OF INVENTION

Technical Problem

In order to effectively secure reliability of software by model checking, an effort for acquiring an inspection code needs to be reduced by a method of automatically generating the inspection code written in an input language of a model checker from a source code, and a specification and a design of software need to be abstracted so that comprehensive inspection by the model checker is terminated with a realistic time calculation amount and a realistic space calculation amount.

Further, since process performance often actually not a little deviates from a design value due to causes such as a usage situation of a cache or a bus/a physical constraint of an external mechanism or the like, actually measured data is measured according to a selected abstraction level and the validity of a validation result needs to be verified.

However, according to the method disclosed in Patent Literature 1, there are problems in that (1) it is difficult to change an abstraction level, (2) a follow-up cost for software design change is high, (3) a cost when inspection is performed by another model checker is high, and (4) a cost when measuring a process time at an abstraction level selected by a user is high.

Regarding the problem of (1), according to the method disclosed in Patent Literature 1, a change of a translation map is limited only when a new type command is introduced into the source code, such as correction of a source code, and the like. Therefore, a method for the user to change the level of the abstraction is limited to a method of correcting a source code to be inspected before conversion, a method of correcting an inspection code written in an input language of a predetermined model checker after conversion, and a method of correcting an environment model, and the user makes a lot of efforts even in any method.

Regarding the problem of (2), according to the method disclosed in Patent Literature 1, when a change such as a change of a used library occurs, correction of the translation map and correction of the environment model need to be performed. However, by considering that the translation map is constituted by map components that directly convert the source code into the inspection code and that the environment model is written in the input language of the predetermined model checker, correction is difficult while maintaining consistency to follow up the design and the change.

Regarding the problem of (3), according to the method disclosed in Patent Literature 1, correction of the translation map and correction of the environment model need to be performed for inspecting with another model checker. However, by considering that the translation map is constituted by map components that directly convert the source code into the inspection code and that the environment model is written in the input language of the predetermined model checker, both the translation map and the environment model need to be corrected, and as a result, a large cost is required.

Regarding the problem (4), according to the method disclosed in Patent Literature 2, an observation code cannot be inserted according to the abstraction level selected by the user and the observation code needs to be separately manually inserted into the source code, and as a result, large cost is required.

Further, since the user cannot perform inspection of a functional requirement, the inspection code needs to be manually prepared at an inspection level which the user desires in order to validate a nonfunctional requirement, and as a result, the cost is large, reusability is also low, and the like.

Further, there is a need that the user wants to manage a trade-off between an inspection level and the number of states. That is, in inspecting a complex system, the state explosion easily occurs, and thus inspecting cannot be completed. In this case, it may be preferable that inspecting can be completed rather than a case in which nothing can be inspected even though a level is lowered a little. For example, when a predetermined error occurs in repeated execution, the predetermined error is not detected by removing the repetition, but the number of states may be significantly reduced.

Further, in an automatically comprehensive performance validation technique using the model checking technique illustrated in FIG. 15, a theoretical value is frequently far away from an actual measurement value. That is, since influence rate by an installation method is high, a difference between the theoretical value and the actual measurement value is easily increased. As a result, unit for measuring the actual measurement value is required.

An object of the present invention is to provide a method of converting a source code and a program of converting a source code that implement cost reduction and improvement of reusability by enabling an inspection code to validate a nonfunctional requirement at an inspection level which a user desires to be inspected to be easily generated.

Another object of the present invention is to provide a method of converting a source code and a program of converting a source code that can flexibly cope with an abstraction level, or the like, insert a measurement observation code depending on the abstraction level into a source code, and facilitate a trade-off between an inspection level and the number of states by measuring a difference of a theoretical value and an actual measurement value.

Solution to Problem

A representative invention will be described below. A method of converting a source code by a source code conversion apparatus includes the steps of: inputting a source code of software; inputting a plurality of different conversion rules; inputting a nonfunctional rule which is a constraint relating to process performance; and converting the source code into a nonfunctional inspection code written in an input language of a validation tool by the plurality of different conversion rules and the nonfunctional rules.

Advantageous Effects of Invention

According to the present invention, there is provided an interface that inputs a plurality of conversion rules divided with a fine grade. Therefore, an abstraction-level change by a user is easily implemented by an operation of selecting and inputting a plurality of different conversion rules corresponding to a source code to be inspected. As a result, even in complicated and large-scale software, a functional requirement and a nonfunctional requirement of an input source code may be easily validated at the level selected by the user and development cost of software such as an inspection code, or the like may be remarkably reduced.

BRIEF DESCRIPTION OF DRAWINGS

FIG. 9 is a diagram illustrating a configuration example of a source code conversion system including a source code conversion apparatus according to a second embodiment.

DESCRIPTION OF EMBODIMENTS

Figure 1:
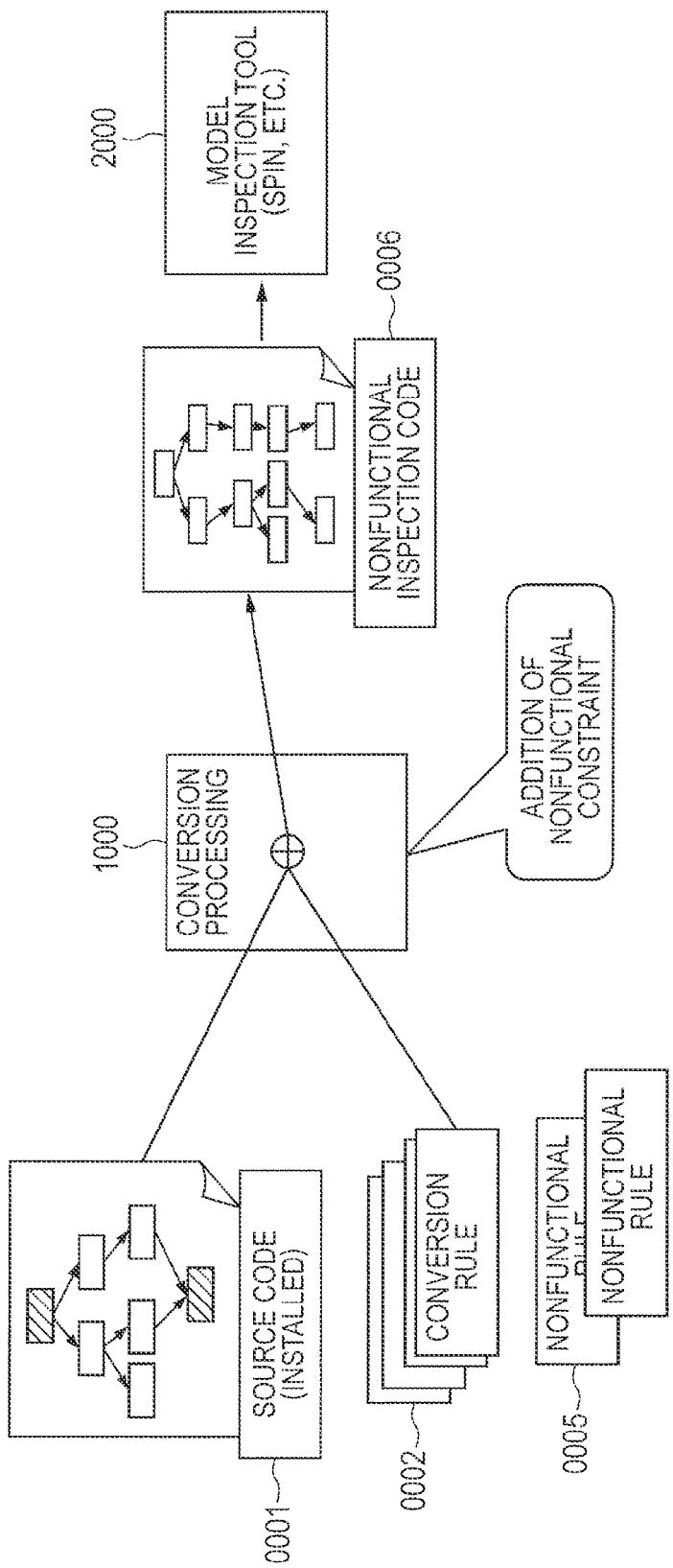
FIG. 1 is a diagram for describing a basic concept of the present invention.

In the present invention, a source code to be inspected is converted into an inspection code added with a nonfunction written in an input language of a model checker by using a plurality of different conversion rules, in order to validate nonfunction, that is, process performance of software. By means of the plurality of different conversion rules, the source code to be inspected is converted into the inspection code written in the input language of the model checker, a series of abstracted processes are divided with a fine grade, and the source code is converted into the inspection code added with the nonfunction by combining and using the plurality of conversion rules.

In the present invention, the series of processes of converting the source code to be inspected to the inspection code added with the nonfunction are divided with the fine grade in addition to even the abstraction process, and the respectively divided process is called a "conversion rule". Further, the inspection code added with the nonfunction means an inspection code (hereinafter, simply referred to as a nonfunctional inspection code) added with a nonfunctional constraint to enable a nonfunctional requirement and a functional requirement to be validated with respect to the respective processes divided with the fine grade. In addition, a "nonfunctional rule" defines a conversion rule for converting the nonfunction (a constraint relating to the process performance) into the inspection code.

An apparatus of converting a source code, which is implemented by the present invention has an interface for a user to select and input a plurality of different conversion rules or "nonfunctional rules" at the time of converting a source code into an inspection code. The conversion rule or "nonfunctional rule" is input by any one means of selecting the plurality of conversion rules or "nonfunctional rules" accumulated in the source code converting apparatus in advance, and user's writing.

Further, in the present invention, the conversion rule is classified into an installation-generalization conversion rule of converting a source code to a format (generalization model) having generalized program information which does not depend on a writing language of the source code, an abstraction conversion rule of abstracting the generalization model, and a generalization-inspection conversion rule of converting the generalization model to a writing language of a model checker. In other words, the plurality of different conversion rules is classified into a first conversion rule of converting the source code into an intermediate format which is a format not dependent on a predetermined programming language, a second conversion rule of performing abstraction processing of the intermediate format, and a third conversion rule of converting the intermediate format into the nonfunctional inspection code. Conversion of the source code into the inspection code is implemented by subsequently performing four steps of a step for converting a source code into a generalization model by the installation-generalization conversion rule, a step for abstracting the generalization model by the abstraction conversion rule, a step for adding the nonfunctional constraint to the abstracted generalization model, and a step for converting the generalization model into a nonfunctional inspection code by the generalization-inspection conversion rule.

In other words, conversion of the source code into the inspection code is implemented by subsequently performing four steps of a step for inputting one or more of first, second, and third conversion rules, a step for converting the source code of software into the intermediate format by using the first conversion rule, a step for abstracting software expressed in the intermediate format by using the second conversion rule, a step for adding a nonfunctional constraint to the intermediate format by using the nonfunctional rule, and a step for converting the intermediate format into a validation code written in an input language of a validation tool by using the third conversion rule.

Further, in the present invention, in a series of processes of converting the source code to be inspected to the inspection code, a format of information (model) which is internally kept is defined by a meta model. The model is classified into an installation model having information corresponding to the source code to be inspected, the aforementioned generalization model, and an inspection model having information corresponding to the writing language of a model checker. The installation model is defined by a meta installation model which is a meta model thereof, the generalization model is defined by a meta generalization model which is a meta model thereof, and the inspection model is defined by a meta inspection model which is a meta model thereof. The aforementioned respective meta models store definition of a data structure and information on a constraint between components included in the data.

Further, according to another embodiment of the present invention, the method a step for converting the intermediate format into an abstracted intermediate format by the plurality of different conversion rules; a step for converting the source code into the nonfunctional inspection code; a step for adding an observation point to the abstracted intermediate format; a step for converting the abstracted intermediate format added with the observation point into the intermediate format added with the observation point by a plurality of different inverse conversion rules, and a step for converting the intermediate format added with the observation point into a source code added with the observation point by the plurality of different inverse conversion rules.

Hereinafter, embodiments of the present invention will be described in detail with reference to the accompanying drawings.

First, a basic concept of the present invention will be described with reference to FIGS. 1 and 2. In the present invention, a source code is converted into a nonfunctional inspection code suitable for an existing model checking apparatus by performing conversion processing of combining a plurality of conversion rules. That is, (a) "conversion" is divided with a fine grade and is packaged by the combination of the plurality of "conversion rules" to implement flexible conversion. (b) A user (inspector) inputs a source code 0001 to be inspected, selects a "conversion rule" 0002 depending on the source code to be inspected and an inspection level, abstracts software expressed as an intermediate format by a conversion process 1000, and adds a nonfunctional constraint based on a nonfunctional rule 0005 to each part (function) of the abstracted software to acquire a desired nonfunctional inspection code 0006. It is determined whether a constraint condition of a system is satisfied in a model checking tool 2000 with respect to the nonfunctional inspection code 0006. In the case where the constraint condition is not satisfied, the conversion process 1000 is repeated by correcting the source code. By this configuration, the nonfunctional inspection code 0006 to satisfy the constraint condition of the system is generated.

In the present invention, an example of the "conversion rule" is as follows.

(a) Simple Syntax Conversion

"Conditional branch (If statement/Switch statement) of C language" is converted into "conditional branch (If statement) of inspection code"

"Repetition statement (for statement/while statement/ . . . ) of C language" is converted into "repetition (Do statement) of inspection code"

(b) Modeling of External Environment

"Data reading" is substituted with "random input"

(c) Abstraction

"Removal of repetition"

"Simplification of condition"

Further, in the present invention, a temporal constraint or a capacitive constraint is applied to the "nonfunctional" rule. That is, in the present invention, the nonfunctional requirement includes a process time, a memory usage, or both thereof.

Figure 2:
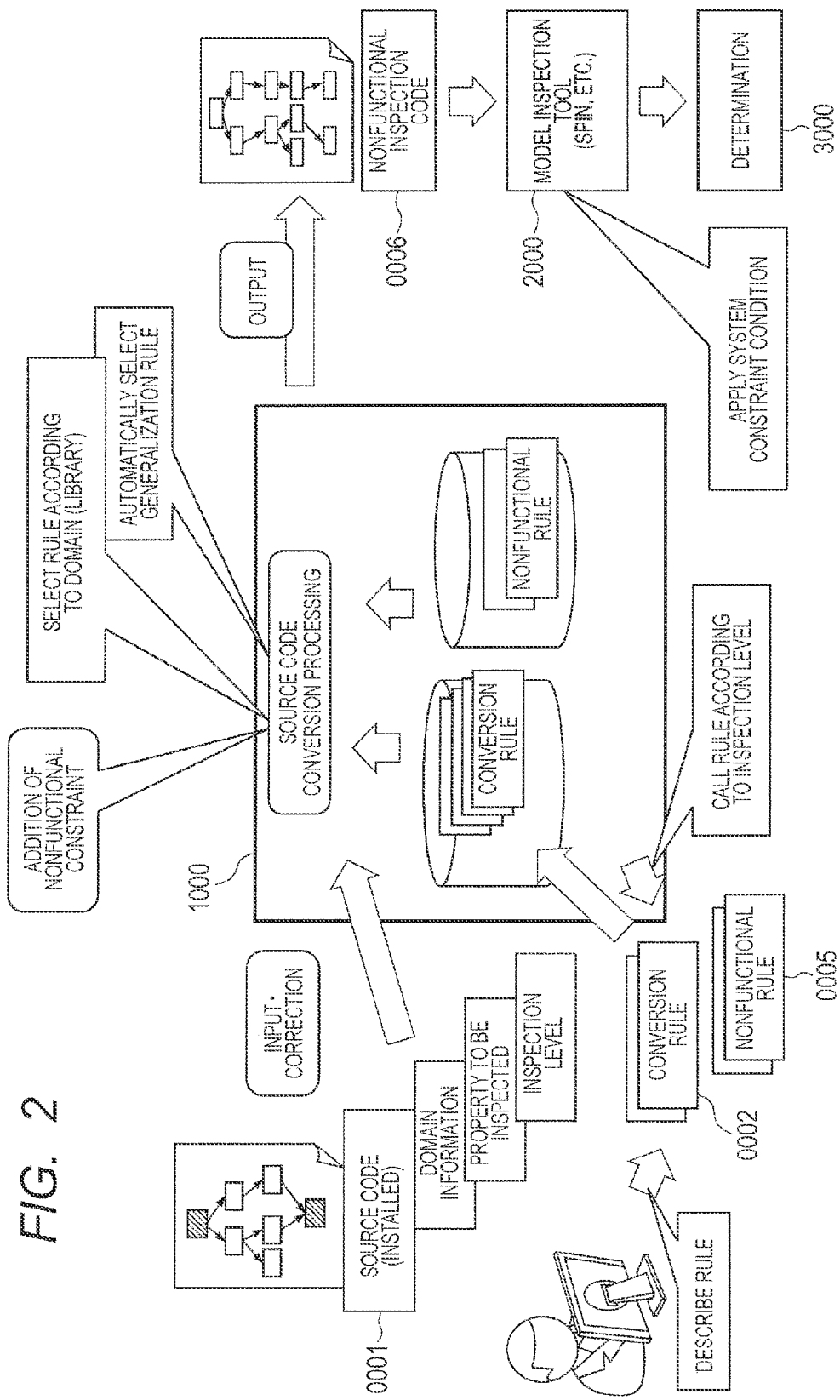
FIG. 2 is a diagram for describing an input interface of a conversion rule in source code conversion processing of the present invention.

A description of an input interface of the conversion rule in the source code conversion process of the present invention will be supplemented with reference to FIG. 2.

According to the present invention, by providing an interface that inputs the plurality of conversion rules 0002 divided with the fine grade, the abstraction-level change by the user is easily implemented by an operation of selecting and inputting the plurality of different conversion rules. That is, the abstraction-level change by the user is easily implemented by an operation in which the user selects and calls the plurality of different conversion rules to input the selected and called rule in the source code conversion processing apparatus 1000, according to domain information, a property to be inspected, and inspection-level information (influence on a property due to abstraction).

The present invention is a technology which is effective to validate the functional requirement and the nonfunctional (process performance) of a system (software). That is, an interface to input the nonfunctional rule 0005 is provided capable of generating the desired nonfunctional inspection code 0006 added with the nonfunctional constraint for each part (function) of software abstracted by the user and facilitate validation of the nonfunctional requirement.

Further, the "conversion rule" or the "nonfunctional" rule is applied to the intermediate format of a state divided with the fine grade, and as a result, the nonfunctional inspection code 0006 is generated. The nonfunctional inspection code 0006 needs to determine whether to satisfy the constraint condition, and has a function 3000 to input the determination result in the model checking tool 2000 and determine the result.

According to the present invention, after the source code is converted into the inspection code at a level selected by the user, an unit that add the nonfunctional requirement is provided to enable a nonfunctional inspection at the level designated by the user.

Further, according to the present invention, actually measured data which conforms to the abstraction level selected by the user may be observed and a difference between a theoretical value and an actual measurement value may be observed, and a trade-off between the inspection level and the number of states may be easily resolved.

First Embodiment

Next, a source code conversion apparatus and a conversion processing method according to a first embodiment of the present invention will be described with reference to FIGS. 3 to 11B.

Figure 3:
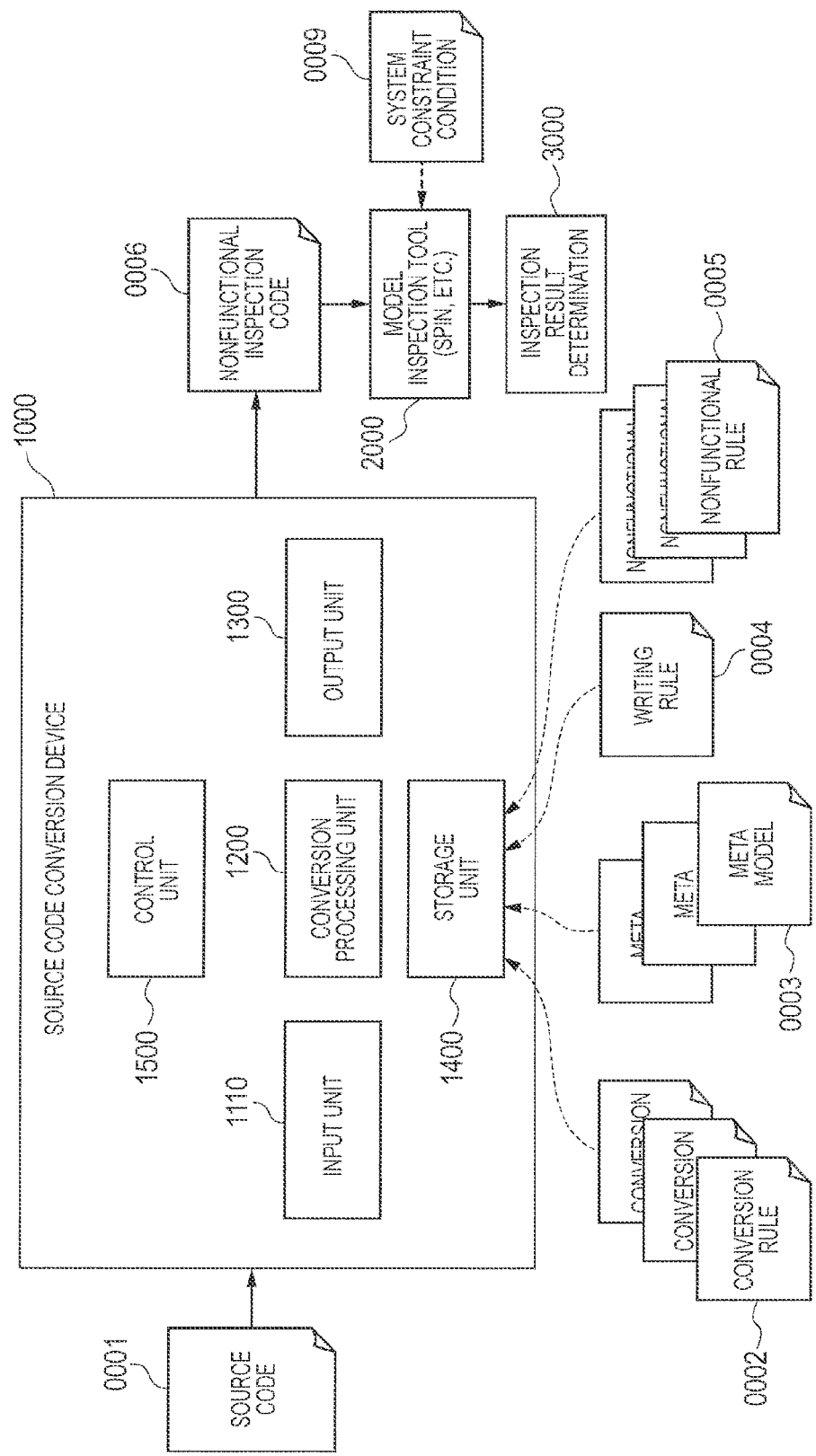
FIG. 3 is a diagram illustrating a configuration example of a source code conversion system according to a first embodiment of the present invention.

FIG. 3 is a diagram illustrating a configuration example of a source code conversion system including the source code conversion apparatus according to the first embodiment. The source code conversion apparatus 1000 applied to the embodiment of the present invention is an apparatus that converts the source code to be inspected into the nonfunctional inspection code 0006, which includes an input unit 1100, a conversion processing unit 1200, an output unit 1300, a storage unit 1400, and a control unit 1500. Reference numeral 2000 represents a model checking tool and reference numeral 3000 represents a determination function of an inspection result. The storage unit 1400 stores a conversion rule 0002, a meta model 0003, a writing rule 0004, and a nonfunctional rule 0005. Further, a system constraint condition 0009 is applied to the model checking tool 2000.

Figure 4:
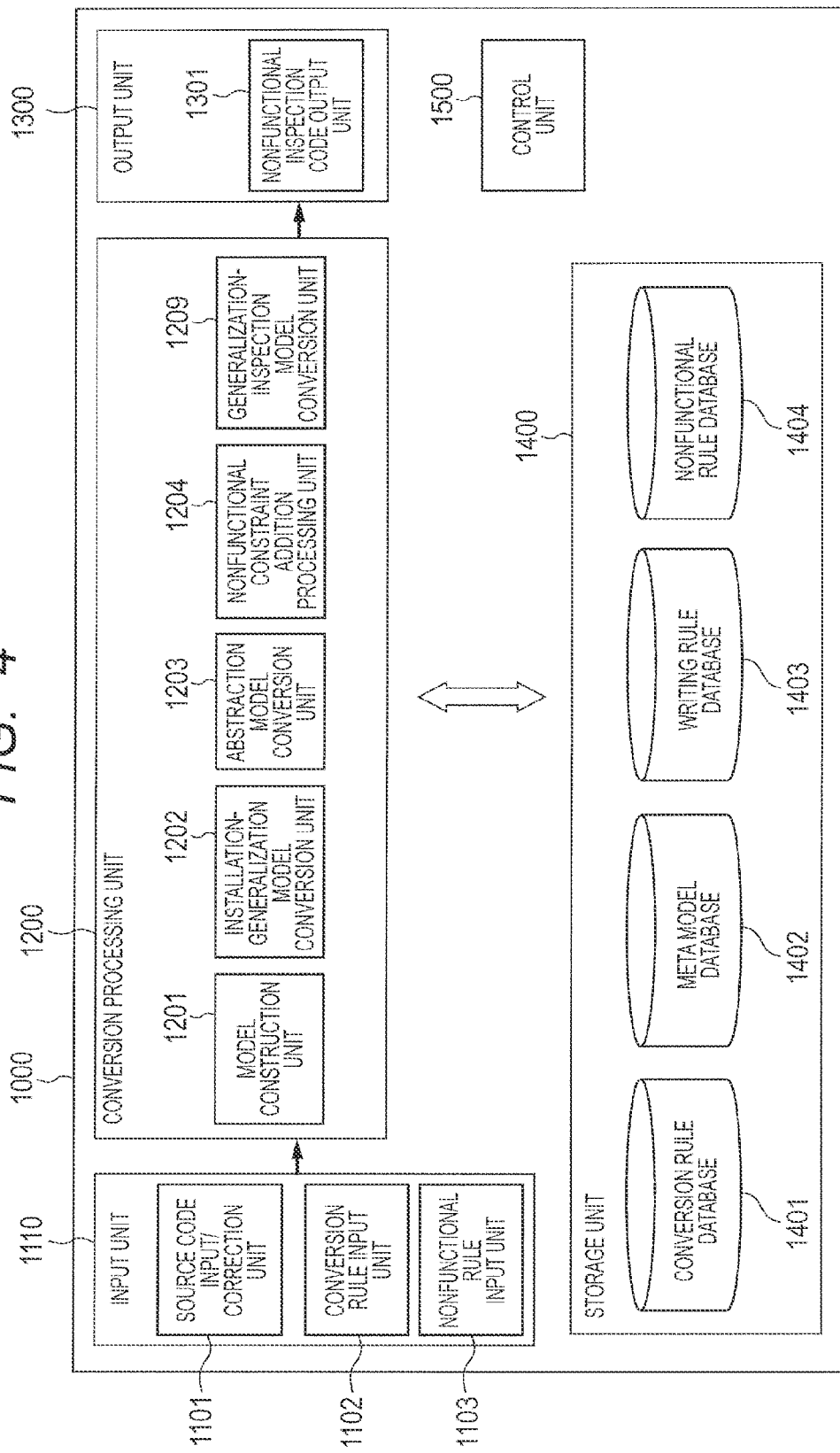
FIG. 4 is a diagram illustrating a configuration example of a source code conversion apparatus in the conversion system of FIG. 3.

FIG. 4 illustrates a configuration example of the source code conversion apparatus 1000. The input unit 1100 includes a source code input unit 1101, a conversion rule input unit 1102, and a nonfunctional rule input unit 1103. The conversion processing unit 1200 includes a model construction unit 1201, an installation-generalization model conversion unit 1202, an abstraction model conversion unit 1203, a nonfunctional constraint addition processing unit 1204, and a generalization-inspection model conversion unit 1209. The output unit 1300 includes a nonfunctional inspection code writing unit 1301. The storage unit 1400 includes a conversion rule database 1401, a meta model database 1402, a writing rule database 1403, and a nonfunctional rule database 1404.

The source code conversion apparatus 1000 is implemented as a program that operates on, for example, one computer or a plurality of computers connected through a network. The source code 0001, the conversion rule set 0002, and the nonfunctional rule 0005 are input by methods such as, for example, a method of reading from a storage device on the computer and a method of direct input by an input device connected to the computer. Further, the nonfunctional inspection code 0006 is output by, for example, a method of writing the nonfunctional inspection code in the storage device of the computer and a method of displaying the nonfunctional inspection code on a display device of the computer.

The input unit 1100 performs processing of receiving data input by a user and providing the input data to the conversion processing unit 1200. The input unit 1100 includes a source code input/correction unit 1101 inputting and correcting information on the source code 0001, a conversion rule input unit 1102 inputting information on a plurality of conversion rules divided with a fine grade, that is, the "conversion rule set" 0002, and a nonfunctional rule input unit 1103 inputting the nonfunctional rule 0005, and provides each received input to the conversion processing unit 1200. In some embodiments, the input unit 1100 may receive a command associated with driving or controlling of the conversion processing unit and driving or controlling of the output unit, from the user.

The conversion processing unit 1200 receives the information of the source code 0001, the information of the conversion rule set 0002 to be applied to the source code 0001, and the nonfunctional rule 0005 from the input unit to convert the source code 0001 by the conversion rule set 0002, perform the processing of adding a nonfunction, and provide information on a conversion result to the output unit 1300. In some embodiments, information regarding the conversion rule set 0002 provided from the input unit includes only identification information indicating the conversion rule stored in the storage unit, and as a result, an entity of the conversion rule set 0002 is taken out from the storage unit 1400 by using the identification information to be used in the conversion.

Figure 6:
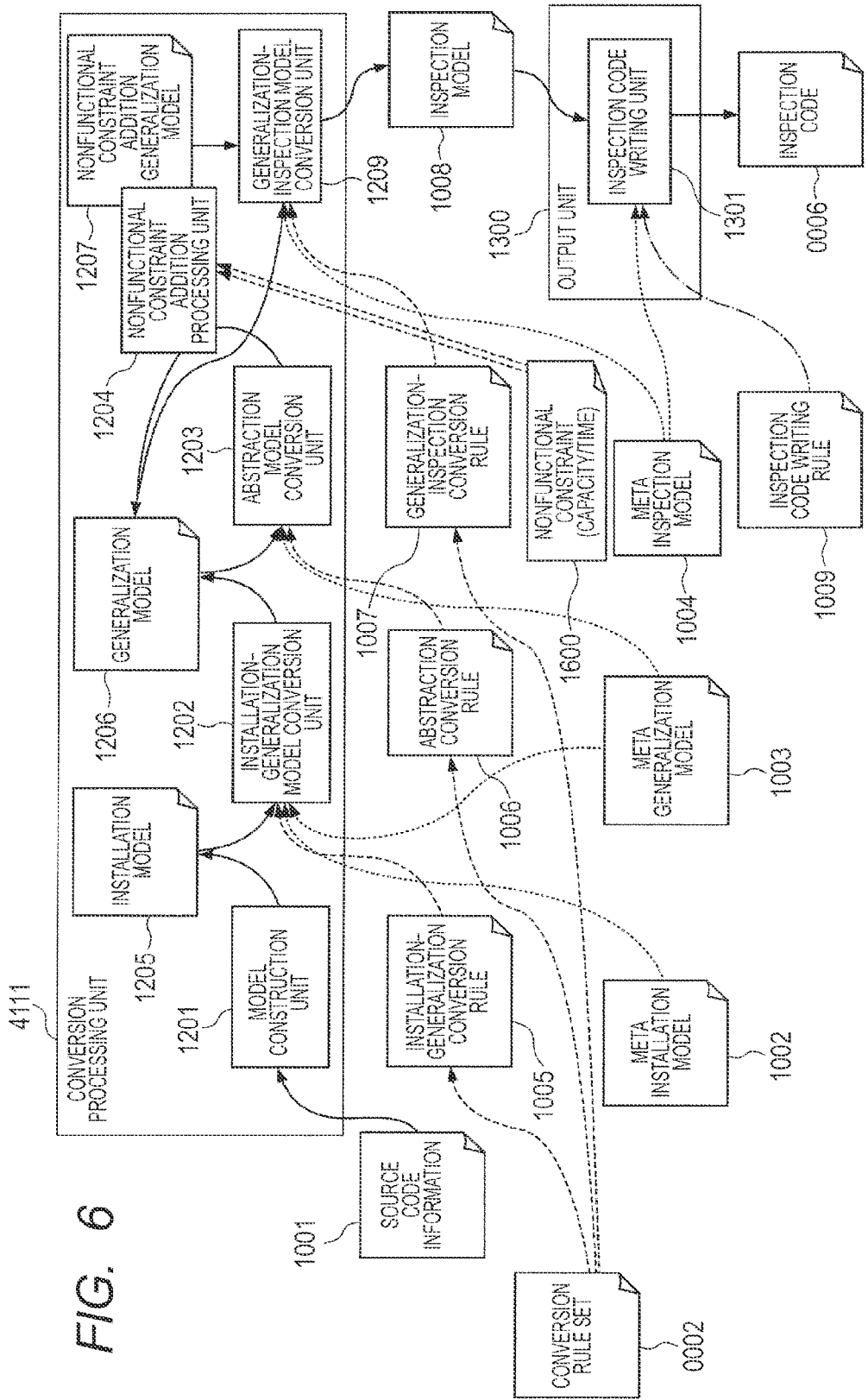
FIG. 6 is a diagram illustrating an operation of the source code conversion apparatus according to the first embodiment.

The conversion processing unit 1200 includes a model construction unit 1201, an installation-generalization model conversion unit 1202, an abstraction model conversion unit 1203, a nonfunctional constraint addition processing unit 1204, and a generalization-inspection model conversion unit 1209. In the embodiment, the conversion processing unit 1200 converts source code information 1001 into an inspection model 1008 through model conversion using the meta models and the conversion rules, as illustrated in FIG. 6. A meta installation model 1002, a meta generalization model 1003, and a meta inspection model 1004 are written in, for example, an MOF disclosed in Non-patent Literature 2. Further, for example, model conversion is performed by describing an installation-generalization conversion rule 1005, an abstraction conversion rule 1006, and a generalization-inspection conversion rule 1007 by a QVT disclosed in Non-patent Literature 3. The conversion may be another model conversion method of the already exemplified method and further, a plurality of methods may coexist.

Further, in some embodiments, the installation-generalization model conversion unit 1202, the abstraction model conversion unit 1203, the nonfunctional constraint addition processing unit 1204, and the generalization-inspection model conversion unit 1209 are not independent from each other but may be constituted by the same part, and further, as meta models of the installation model 1205, the generalization model 1206, and the inspection model 1008, the meta installation model 1002, the meta generalization model 1003, and the meta inspection model 1004 are not individually prepared but may be defined by a single meta model together with the installation model 1205, the generalization model 1206, and the inspection model 1008. Further, in some embodiments, the meta installation model 1002, the meta generalization model 1003, and the meta inspection model 1004 may define formats and constraints of the installation model 1205, the generalization model 1206, and the inspection model 1008, respectively by a plurality of methods. For example, the respective meta models include a constraint condition written in an OCL disclosed in Non-patent Literature 4 in addition to the definition by the MOF and when model conversion is performed, a method of validating whether the constraint condition is satisfied may be provided.

The model construction unit 1201 receives the source code information 1001 from the source code input unit 1101 and converts the received source code information 1001 into the installation model 1205. The format of the installation model 1205 is defined by the meta installation model 1002 which is the meta model thereof. The installation model 1205 preferably has sufficient information required to be converted with the source code information 1001 in order to maximally acquire the effect of the present invention, but in some embodiments, information may be omitted or added without deviating from a purpose of outputting the inspection code.

In some embodiments, the model construction unit 1201 is installed to be inseparable from the source code input unit 1101, and as a result, processing may be performed in such a manner that the source code information 1001 is not generated.

The installation-generalization model conversion unit 1202 converts the installation model 1205 into the generalization model 1206 by using the installation-generalization conversion rule 1005, the meta installation model 1002, and the meta generalization model 1003. The generalization model has a data structure which may express a structure or processing in a plurality of programming languages. For example, in the generalization model, an If statement and a Switch statement are not distinguished from each other in the source code 0001 and the generalization model is expressed as a selection statement. In some embodiments, when the installation model 1205 is converted into the generalization model 1206, only the installation-generalization conversion rule 1005 may be used. Further, in some embodiments, when the installation-generalization conversion rule 1005 includes the plurality of conversion rules, a method may be provided, in which the plurality of conversion rules are integrated into one conversion rule to be used in the conversion of the installation model 1205 into the generalization model 1206. Further, in some embodiments, when the installation-generalization conversion rule 1005 includes the plurality of conversion rules, a procedure of converting the installation model 1205 into the generalization model 1206 may be provided by repeating conversion processing several times.

The abstraction model conversion unit 1203 performs abstraction of the generalization model 1206 by using the abstraction conversion rule 1006 and the meta generalization model 1003. As an example of the abstraction, a method may be provided, in which a conditional equation in the selection statement is substituted to always be valid or always be false, or a non-deterministic selection. In some embodiments, when the generalization model 1206 is abstracted, only the abstraction conversion rule 1006 may be used. Further, in some embodiments, when the abstraction conversion rule 1006 includes the plurality of conversion rules, a method may be provided, in which the plurality of conversion rules are integrated into one conversion rule to be used in the abstraction of the generalization model 1206. Further, in some embodiments, when the abstraction conversion rule 1006 includes the plurality of conversion rules, a procedure of converting the generalization model 1206 may be provided by repeating conversion processing several times.

The nonfunctional constraint addition processing unit 1204 adds a nonfunctional constraint based on the nonfunctional rule 0005 to each part (function) of the abstracted generalization model 1206 to generate the generalization model 1207.

The generalization-inspection model conversion unit 1209 converts the generalization model 1207 added with the nonfunctional constraint into the inspection model 1008 by using the generalization-inspection conversion rule 1007, the meta generalization model 1003, and the meta inspection model 1004. For example, when the inspection code is a Promela type, a component expressed as the selection statement in the generalization model is expressed as the If statement in the inspection model. In some embodiments, when the generalization model 1206 is converted into the inspection model 1008, only the generalization-inspection conversion rule 1007 may be used. Further, in some embodiments, when the generalization-inspection conversion rule 1007 may include the plurality of conversion rules, a method may be provided, in which the plurality of conversion rules are integrated into one conversion rule to be used in the conversion of the generalization model 1206 into the inspection model 1008. In addition, in some embodiments, when the generalization-inspection conversion rule 1007 includes the plurality of conversion rules, a procedure of converting the generalization model 1206 into the inspection model 1008 may be provided by repeating conversion processing several times.

The output unit 1300 outputs the nonfunctional inspection code 0006 by using information on the conversion result provided from the conversion processing unit 1200. In some embodiments, at the time of outputting the inspection code, information such as, for example, grammar information of the writing language of the model checker, and the like may be provided from the storage unit.

The inspection code writing unit 1301 converts the inspection model 1008 into the nonfunctional inspection code 0006 by using the meta inspection model 1004, and the inspection code writing rule 1009 acquired from the writing rule database 1403 of the storage unit 1400. For example, by the method disclosed in Non-patent Literature 5, the inspection code writing rule 1009 is written to convert the inspection model 1008 into the nonfunctional inspection code 0006. Some embodiments are not limited thereto and a predetermined method of converting the inspection model 1008 into a writing format of the model checker used in inspection may be used. The nonfunctional inspection code 0006 is written in Promela which is an input language of a SPIN when the SPIN is used as, for example, the model checker.

In the storage unit 1400, the conversion rule database 1401, the meta model database 1402, the writing rule database 1403, and the nonfunctional rule database 1404 each is implemented by a predetermined data storing method implemented on a computer such as, for example, a relationship database or a hierarchical database. The conversion rule database 1401, the meta model database 1402, the writing rule database 1403, and the nonfunctional rule database 1404 need not be implemented in the same method but may be implemented by different methods. Further, the conversion rule database 1401, the meta model database 1402, the writing rule database 1403, and the nonfunctional rule database 1404 each needs not be implemented in a single method but may be implemented, for example, by combining different methods such as storing some of information to be stored in the relationship database and including some of the information to be stored in a computer program implementing the present invention.

The storage unit 1400 provides information required for the input unit 1100, the conversion processing unit 1200, and the output unit 1300 to perform the respective processing. For example, the storage unit 1400 stores information on the conversion rule, information on the meta model, and information on a grammar of the writing language of the model checker.

The conversion rule database 1401 stores the conversion rule together with the meta data as described above. The meta data is used to select the conversion rule and methods having different information of the installation-generalization conversion rule 1005, the abstraction conversion rule 1006, and the generalization-inspection conversion rule 1007 may be provided. The meta data of the installation-generalization conversion rule 1005 may include, for example, a type of a writing language of a source code of a conversion source. The meta data of the abstraction conversion rule 1006 may include, for example, a name expressed plainly to easily know the abstraction, a simple description, types of abstraction such as "abstraction of data", "abstraction of processing", and the like, an effect of reduction in the number of states by abstraction expressed by a natural word, an alphabet, or a numerical value, an influence of the abstraction expressed by the natural word, the alphabet, or the numeral value on the property, and a domain of software to which the abstraction may be applied. The meta data of the generalization-inspection conversion rule 1007 may include, for example, a name indicating the model checker used in inspection.

Figure 5:
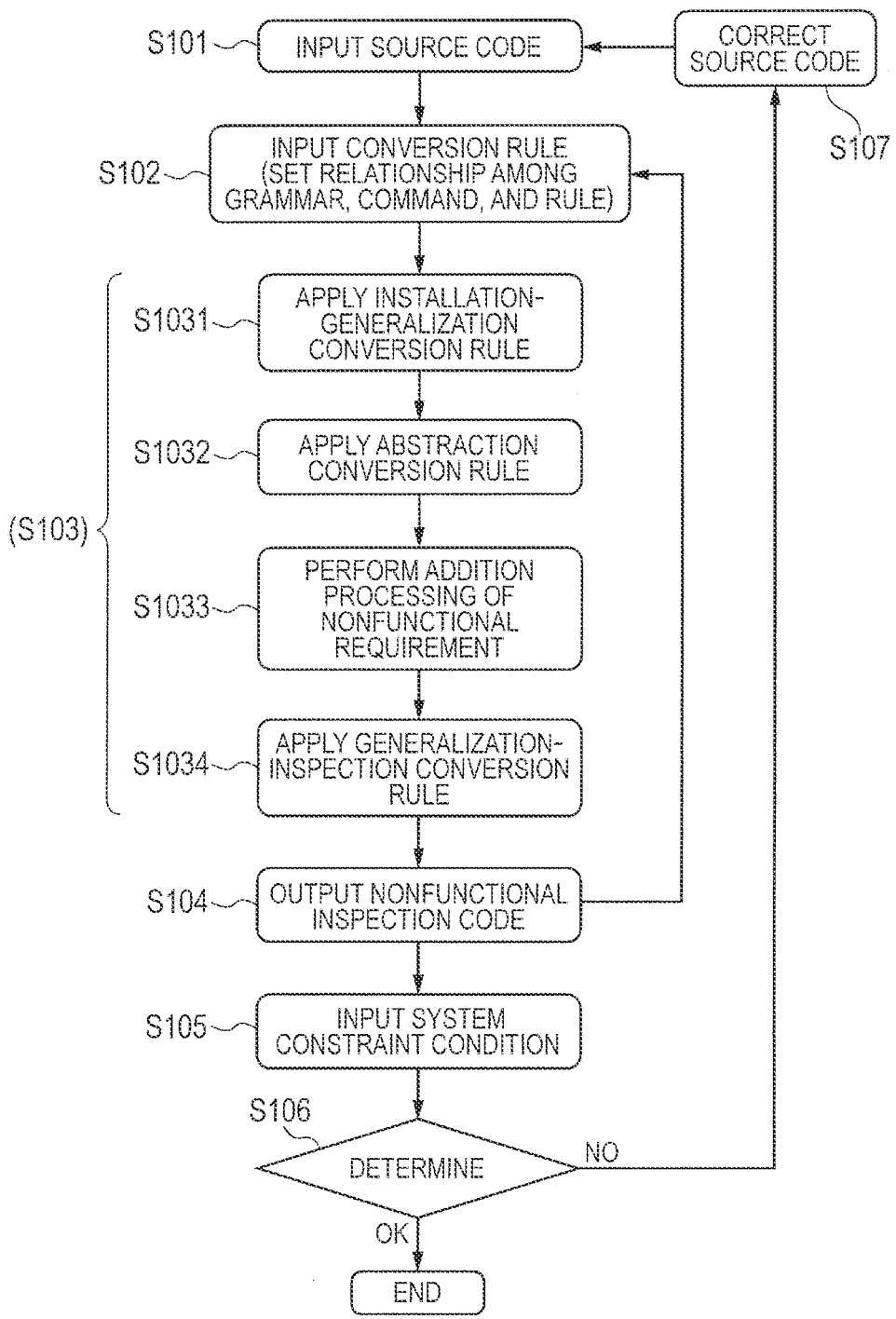
FIG. 5 is a diagram illustrating an example of a processing flow according to the first embodiment.

Thereafter, referring to FIGS. 5 and 6, the input unit 1100, the conversion processing unit 1200, the output unit 1300, the storage unit 1400, and the control unit 1500 will be described in detail.

First, one example of a source code conversion procedure in the embodiment will be described with reference to FIG. 5. FIG. 5 is a diagram illustrating an example of a processing flow according to the first embodiment. The source code conversion procedure in the embodiment includes a source code input step S101, a conversion rule input step S102, a conversion rule application step S103, an inspection code output step S104, a system constraint condition input step S105, a determination step S106, and a correction step S107.

First, in the source code input step S101, the source code 0001 is read by the source code conversion apparatus 1000 to be converted into the source code information 1001, by the source code input unit 1101.

The source code input unit 1101 receives the source code 0001 to be inspected input from the user and converts the received source code 0001 into the source code information 1001. The source code 0001 is written in a C programming language opened in, for example, JIS X3010-1993. The source code information 1001 is stored particularly in, for example, a format of an abstract syntax tree. The format of the source code information 1001 is not limited to the abstract syntax tree and may be a predetermined format in which information required for inspecting the source code 0001, such as a structure or logic is stored.

Subsequently to the source code input step S101, the conversion rule set 0002 which is the plurality of conversion rules divided with the fine grade is read in the source code conversion apparatus 1000 by the conversion rule input unit 1102, in the conversion rule input step S102. In the conversion rule input step S102, any one side or both sides of a corresponding relationship between a component of a model before conversion and a component of a model after conversion, and an operation applied to the component of the model before conversion by conversion are defined. Processing in which the conversion rule set 0002 is read in the source code conversion apparatus 1000 need not be performed by one operation by the user and may be performed by a repeated operation. Further, the source code input step S101 and the conversion rule input step S102 need not be particularly completed in this order, and the source code 0001 may be input by the source code input unit 1101 before the source code information 1001 is generated, and further, the source code 0001 may be input before the conversion rule input unit 1102 requests the source code information 1001 for inputting the conversion rule, and thus processing may be performed in an order in which the processing of the source code input step S101 and the processing of the conversion rule input step S102 coexist. For example, a procedure may be used, in which the source code input unit 1101 receives the source code 0001, the conversion rule input unit receives the conversion rule set 0002, and then the source code input unit 1101 converts the source code 0001 into the source code information 1001.

The conversion rule input unit 1102 receives the conversion rule set 0002 input from the user. A method of receiving the conversion rule set 0002 from the user may include, for example, the following methods.

As an example of a first conversion input method, the conversion rule input unit 1102 takes a conversion rule which the user directly inputs manually, as some of the conversion set 0002.

As an example of a second conversion rule input method, at least some of the conversion rule set 0002 may be input by a conversion rule (writing) written by the user. Alternatively, further, when the input unit 1100 acquires a list of a conversion rule from the storage unit 1400 and presents the acquired list to the user in a format of the list, and the user selects the conversion rule from the list, the input unit 1100 may receive an input of the conversion rule set 0002. That is, the user inputs (writes) a retrieval condition of the conversion rule in the conversion rule input unit 1102 of the input unit 1100 before inputting the conversion rule, and then the conversion rule input unit 1102 acquires a conversion rule, which conforms to the retrieval condition, from the conversion rule database 1401 of the storage unit 1400 and thus presents the acquired conversion rule to the user as the conversion rule list. Subsequently, the user selects one or more conversion rules included in the presented conversion rule list. The conversion rule input unit 1102 receives one or more conversion rules selected by the user as some of the conversion rule set 0002.

As an example of a third conversion rule input method, first, the user may input the retrieval condition 0011 of the conversion rule into the conversion rule input unit 1102 before inputting the conversion rule, and subsequently, the conversion rule input unit 1102 may acquire the conversion rule which conforms to the retrieval condition from the conversion rule database 1401 and receive the acquired conversion rule as some of the conversion rule set.

As an example of a fourth conversion rule input method, the conversion rule input unit 1102 extracts and generates a retrieval condition of the conversion rule from the input source code 0001 and acquires the conversion rule which conforms to the retrieval condition from the conversion rule database 1401 and thus receives the acquired conversion rule as some of the conversion rule set.

Further, as an example of a fifth conversion rule input method, the conversion rule input unit 1102 receives the conversion rule by processing a conversion rule input by a predetermined method. An example of the processing method may include a method in which the conversion rule is kept in the conversion rule database 1401 in a state in which a variable name, and the like in the source code 0001 is parameterized and a thing filling the parameter with information of the source code 0001 is included in the conversion rule set by, for example, a method by a user's explicit input.

Subsequently to the conversion rule input step S102, in the conversion rule application step S103, the model construction unit 1201 converts the source code information 1001 into the installation model 1205, and subsequently, the installation-generalization model conversion unit 1202 converts the installation model 1205 into the generalization model 1206 (S1031), and the abstraction model conversion unit 1203 abstracts the generalization model 1206 (S1032). The nonfunctional constraint based on the nonfunctional rule 0005 is added to each part (function) of the abstracted generalization model 1206 and the generalization model 1207 is generated (S1033), and subsequently, the generalization-inspection model conversion unit 1209 converts the generalization model 1207 into the inspection model 1008 (S1034). The conversion rule input step S102 and the conversion rule application step S103 need not be particularly completed in this order, the installation-generalization conversion rule 1005 may be input up to the processing of the installation-generalization model conversion unit 1202, the nonfunctional rule 0005 and the abstraction conversion rule 1006 may be input up to the processing of the abstraction model conversion unit 1203, and the generalization-inspection conversion rule 1007 may be input up to the processing of the generalization-inspection model conversion unit.

Subsequently to the conversion rule application step S103, in the inspection code output step S104, the inspection code writing unit 1301 writes the inspection model 1008 as the nonfunctional inspection code 0006. Designation of a writing location of the nonfunctional inspection code 0006 needs not particularly be subsequent to the conversion rule application step S103 and may be performed before writing the nonfunctional inspection code 0006. For example, a procedure in which the designation of the writing location of the nonfunctional inspection code 0006 is performed in parallel to the source code input step S101 may be provided.

Further, subsequently to the inspection code output step S104, the process proceeds to the conversion rule input step S102, and as a result, it is possible to take a procedure of repeating the already input source code 0001 and converting the source code by using another conversion rule set 0002. Further, in some embodiments, subsequently to the inspection code output step S104, the process proceeds to the conversion rule input step S102, and as a result, all or some of the conversion rule set 0002 which has already been input and the conversion rule set 0002 newly input in the conversion rule input step S102 are combined with each other to be used as the conversion rule set 0002.

The nonfunctional inspection code 0006 is input into the model checking tool 2000. The system constraint condition 0009 is applied to the model checking tool 2000 in the system constraint condition input step S105 (an input timing in step S105 may be therebefore). In addition, in step S106, it is determined whether the nonfunctional inspection code 0006 satisfies the system constraint condition 0009. When the nonfunctional inspection code 0006 does not satisfy the system constraint condition 0009, the source code is corrected by an operator in step S107 and hereinafter, the same processing is repeated until the nonfunctional inspection code 0006 satisfies the system constraint condition 0009.

Figure 7:
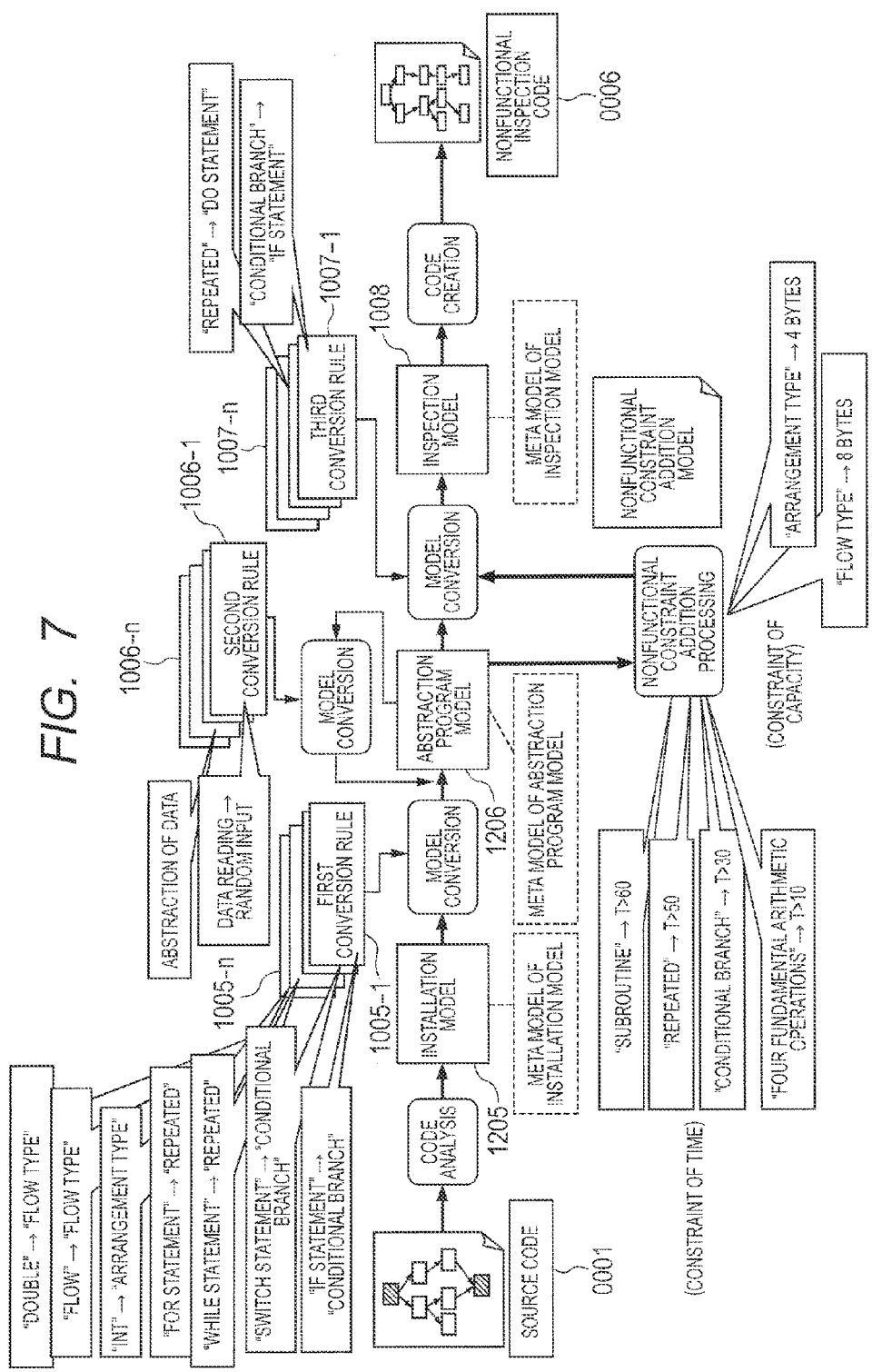
FIG. 7 is a diagram illustrating the source code conversion procedure according to the first embodiment in more detail.

Next, referring to FIGS. 6 and 7, a conversion processing unit 4111 will be described in detail. FIG. 6 is a diagram describing an operation of the source code conversion apparatus according to the first embodiment. FIG. 7 is a diagram describing the source code conversion procedure according to the first embodiment in more detail.

In the embodiment, the conversion processing unit 4111 converts source code information 1001 into the nonfunctional inspection model 1008 by model conversion using the meta models and the conversion rules. First, the model construction unit 1201 receives the source code information 1001 from the source code input unit 1001 and converts the received source code information 1001 into the installation model 1205. The installation-generalization model conversion unit 1202 extracts the installation-generalization conversion rule 1005 from the conversion rule database and the meta installation model 1002 and the meta generalization model 1003 from the meta model database 1 to convert the installation model 1205 into the generalization model 1206. The abstraction model conversion unit 1203 extracts the abstraction conversion rule 1006 from the conversion rule database and the meta generalization model 1003 from the meta model database to abstract the generalization model 1206. The nonfunctional constraint addition processing unit 1204 adds the nonfunctional requirement to a model element corresponding to the generalization model 1206 by extracting the nonfunctional requirement 1600 from the nonfunctional rule database to generate the generalization model 1207 added with the nonfunctional requirement. For example, the nonfunctional requirement is expressed in a table format including the model element and a requirement item.

The generalization-inspection model conversion unit 1209 extracts the generalization-inspection conversion rule 1007 from the conversion rule database and the meta generalization model 1003 and the meta inspection model 1004 from the meta model database to convert the generalization model 1207 added with the nonfunctional requirement into the inspection model 1008. For example, by processing the nonfunctional requirement, in the case where the model checking tool is UPPAAL, the inspection code is converted into a format of a timed automaton. The nonfunctional inspection code output unit 1301 converts the inspection model 1008 into the nonfunctional inspection code 0006 by using the meta inspection model 1004, and the inspection code writing rule acquired from the writing rule database. For example, in the case where UPPAAL is used as the model inspection tool, a model may be directly input, and as a result, the model is written without conversion processing.

As such, in the invention, the following processing is performed for stepwise conversion using the model conversion technique.

(1) The source code 0001 is converted into the "installation model" 1205 (substantially) equivalent thereto.

(2) The "installation model" is converted into the "generalization mode" expressing program information such as a structure or logic in a format which is not dependent on a predetermined programming language.

That is, the "installation model" 1205 is converted into the "generalization model" 1206 of an intermediate format which is not dependent on the predetermined programming language by using at least one of a plurality of different first conversion rules 1005-1 to 1005-*n*. In an example of FIG. 7, as the first conversion rule, at least seven different conversion rules of ""if statement"→"conditional branch"", ""switch statement"→"conditional branch"", ""while statement"→"repeated"", ""for statement"→"repeated"", ""int statement"→"arrangement type"", ""flow statement"→"flow type"", and ""double statement"→"flow type"" are selected.

(3) Processing of adding the nonfunctional constraint to the "generalization model" 1206 is performed.

That is, the intermediate-format "generalization model" 1206 is converted into the generalization model 1207 added with the nonfunctional constraint by using the nonfunctional rule. In the example of FIG. 7, as a constraint (unit: seconds) of the time, different nonfunctional rules of ""subroutine"→"t>60", ""repeated"→"t>50", ""conditional branch"→"t>30", and ""four fundamental arithmetic operations"→"t>10" are selected. Further, as a constraint of the capacity, different nonfunctional rules of ""arrangement type"→"4 bytes" and ""flow type"→"8 bytes" are selected.

(4) The generalization model 1207 added with the nonfunctional constraint is converted for abstraction.

That is, the intermediate-format generalization model is abstracted by using at least one of a plurality of different second conversion rules 1006-1 to 1006-*n*.

In the example of FIG. 7, as the second conversion rule, at least two different conversion rules of "data reading→random input" and "abstraction of data" are selected.

(5) The generalization model is converted into the "nonfunctional inspection model" and a code is generated (output).

That is, the intermediate-format generalization model 1207 is converted to the nonfunctional inspection model 1008 having information required to generate the nonfunctional inspection code by using at least one of a plurality of different third conversion rules 1007-1 to 1007-*n*. In the example of FIG. 7, as the third conversion rule, at least two different conversion rules of ""conditional branch"→"if statement"" and ""repeated"→"do statement"" corresponding to the first conversion rule are selected.

Further, a data structure and a semantic theory of each of the installation model, the generalization model, and the inspection model are defined by the "meta model" that defines syntax.

As such, when the installation model is converted into the generalization model, for example, in the case where a grammar of a writing language of a source code to be converted includes "for statement" or "white statement" as a technique of repetition processing, the user selects a rule of converting "for statement" into "repeated" and a rule of converting "while statement" into "repeated" as the first conversion rule by using the aforementioned conversion rule input method. During conversion of the abstraction of the generalization model, as a conversion rule in which the user determines an inspection level (the level of the abstraction) and achieves the determined inspection level, a rule of converting a command and a series of processes regarding external data reading into a random input and a rule of converting a predetermined data format into a format having a higher abstraction level are selected as the second conversion rule by using the conversion rule input method. Further, when the generalization model is converted into the inspection model, for example, in the case where the grammar of the input language of the model checker includes "do statement" as the technique of the repetition processing, the user selects the rule of converting "repetition" into "do statement" as the third conversion rule by using the aforementioned conversion rule input method. As the conversion rule, repetitively usable rules such as a general rule which is applicable throughout a plurality of software are made into a database. A conversion rule stored in the database includes domain information or inspection-level (influence on the inspection due to the abstraction) information, as meta information used as a material for retrieval by the user or determination for rule selection.

Further, selection methods of the conversion rule are as follows.

(1) General rule: always selected (2) Rule which depends on a predetermined library: arranged and selected by inputting a used library or a domain (category) to be inspected (3) Rule corresponding to abstraction: automatically generated based on a property selected by the user, or input by the user himself/herself's writing and inputting or inspecting, from a conversion rule list (acquired by inputting a property to be inspected and the inspection level)

Figure 8A:
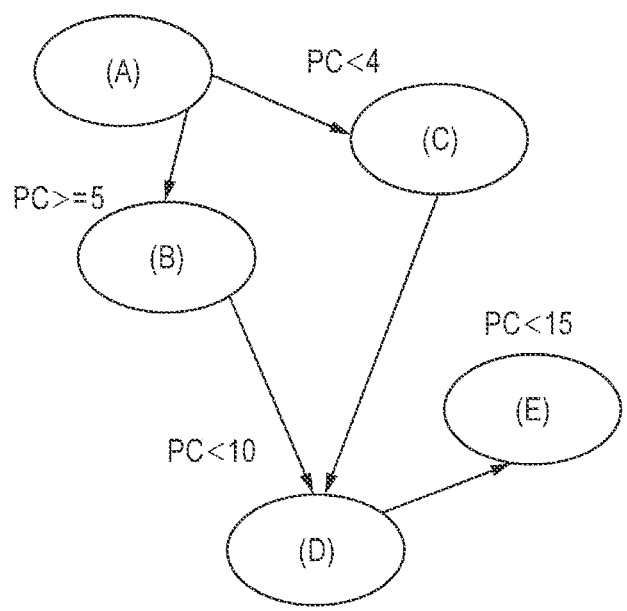
FIG. 8A is a diagram an automaton acquired by source code conversion according to the first embodiment.

In the invention, when the inspection model is generated from the source code according to the conversion rule, a processing time corresponding to each execution environment is written to each part (function) abstracted software to apply a concept of a time to the automaton. For example, as illustrated in the automaton of FIG. 8A, the processing time PC may be written as a constraint corresponding to the execution environment with respect to each part of the abstracted software, that is, each of the states (A) to (E). As a result, the user selects the conversion rule or the nonfunctional rule according to the source code to be inspected and the inspection level (the abstraction level) to convert the source code to be inspected into an inspectable nonfunctional inspection code and a problem of nonfunctional validation at the abstraction level selected by the user is solved.

Figure 8B:
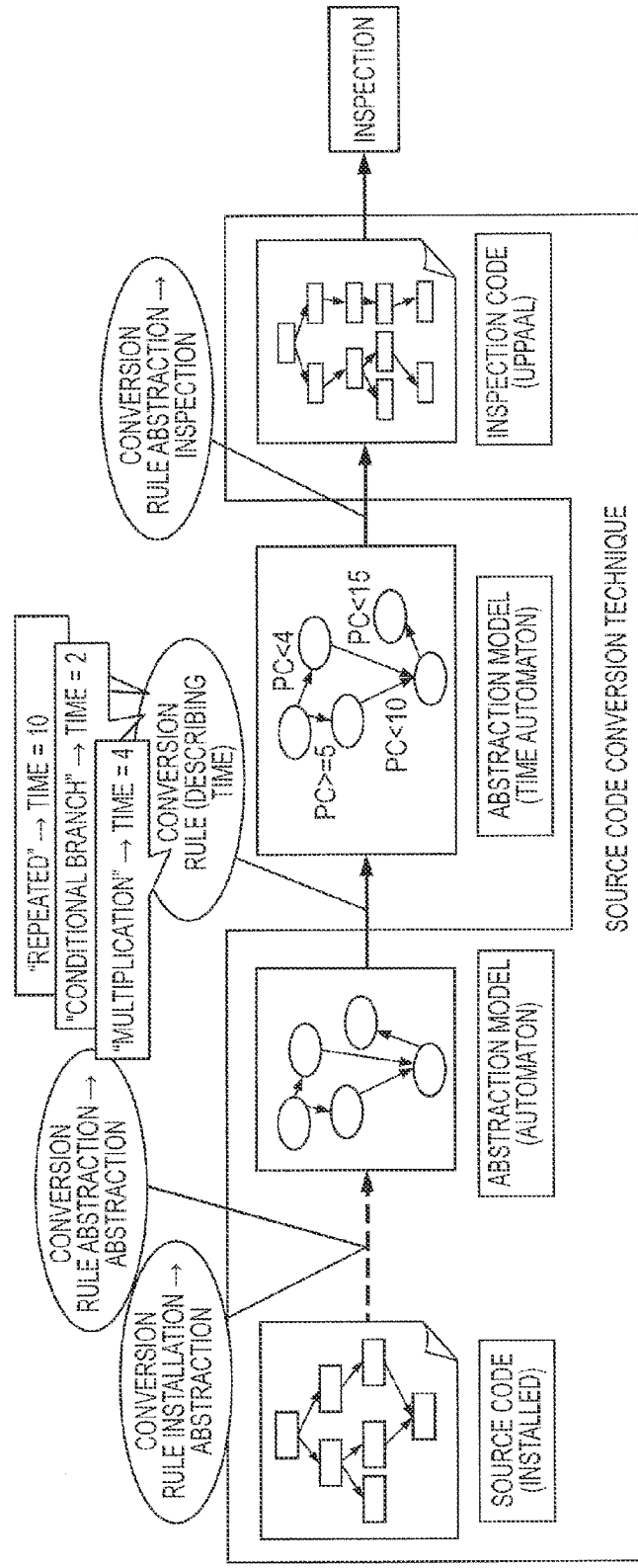
FIG. 8B is a diagram illustrating an overall overview of a source code conversion technique according to the first embodiment.

According to the invention, as illustrated in FIG. 8B, a functional requirement or a nonfunctional requirement corresponding to the abstraction level may be validated and further, it is possible to handle various execution environments only by changing the conversion rule.

That is, the number of states may be reduced by the abstraction of the model. However, the abstraction may influence the property of the model. For example, a detected defect (counter example) is not present in an original system or the defect that is present in the original system may not be discovered. Meanwhile, sound abstraction that does not influence the property tends to be small in an effect of reduction in number of states.

According to the invention, an interface of inputting the plurality of conversion rules divided with the fine grade is provided, and as a result, the abstraction-level change by the user or the addition of the nonfunctional constraint is easily implemented by the operation of inputting the conversion rule. That is, the user may select the addition of a conversion rule of a plurality of fine grades or the nonfunctional constraint by means of the input interface.

The source code conversion method has a procedure of converting the source code to be inspected into the inspection code written in the input language of the model checker by using the plurality of conversion rules, and the conversion rule is classified into the installation-generalization conversion rule, the abstraction conversion rule, and the generalization-inspection conversion rule, and as a result, conversion is performed stepwise. As a result, at the time of following up the design change of the source code to be inspected, only the addition of a conversion rule associated with the change among the plurality of conversion rules or the nonfunctional constraint is changed, and as a result, the change may be minimally achieved. Moreover, the installation model, the generalization model, and the inspection model are defined as the meta models, respectively and the constraint is added to validate that the conversion result by the conversion rule is not false. Therefore, it is possible to prevent increase in validation costs of the conversion rule and the nonfunctional rule which are caused by implementing a series of processes of abstracting and converting the source code to be inspected into the inspection code by combining the conversion rule of the fine grade and the nonfunctional rule.

Further, the interface of inputting the plurality of conversion rules divided with the fine grade is provided, and as a result, the abstraction-level change by the user is easily implemented by the user's operation of selecting and inputting the conversion rule and the nonfunctional rule according to the desired property to be inspected and the inspection level. As a result, a problem in which it is difficult to change the abstraction level may be solved, and cost to write the inspection code by means of the input language of the model checking tool may be reduced. For example, when there is a predetermined error which occurs only in repeated execution, the predetermined error is not detected by removing the repetition, but the number of states may be significantly reduced while detection of the error which does not include repetition as an occurrence cause is possible.

Further, the conversion rule and the nonfunctional rule of the model are accumulated and reused in the database to handle the design change of the source code to be inspected or application of separate software at low cost.

As an example of the nonfunctional validation of the system (software) according to the invention, an example of validation relating to the time constraint of the system is as follows.

(1) It is verified that a channel of a DTV is changed within 1 second.

(2) It is verified that a super-resolution algorithm is terminated within $1/120$ seconds per one screen.

(3) It is verified that when abnormality of the apparatus is detected by a sensor, the detected abnormality is notified to the user within 5 seconds.

Second Embodiment

Next, referring to FIGS. 9 to 14, a source code conversion apparatus and a conversion processing method according to a second embodiment of the invention will be described. In the embodiment, it is characterized in that the conversion processing method includes a step for adding an abstracted flag to an intermediate format after abstraction conversion. That is, as the source code conversion method by the source code conversion apparatus, a source code of software, a plurality of different conversion rules, and a plurality of different inverse conversion rules are input into the source code conversion apparatus, the source code is converted into the intermediate format by the plurality of different conversion rules, and further, the intermediate format is converted into an abstraction intermediate format by the plurality of different conversion rules. In addition, an observation point is added to the abstraction intermediate format. Further, the abstraction intermediate format added with the observation point is converted into the intermediate format added with the observation point by the plurality of different inverse conversion rules, and the intermediate format added with the observation point is converted into a source code added with the observation point by the plurality of different inverse conversion rules.

FIG. 9 is a diagram illustrating a configuration example of a source code conversion system including the source code conversion apparatus according to the second embodiment. The source code conversion apparatus 1000 applied to the embodiment of the invention is an apparatus that converts the source code 0001 to be inspected into a nonfunctional inspection code 0007 and outputs a measurement added source code 0008, and includes an input unit 1110, a conversion processing unit 1200, an output unit 1300, a storage unit 1400, and a control unit 1500. Reference numeral 2000 represents a model checking tool, and reference numeral 4000 represents an actual measurement apparatus.

Figure 10:
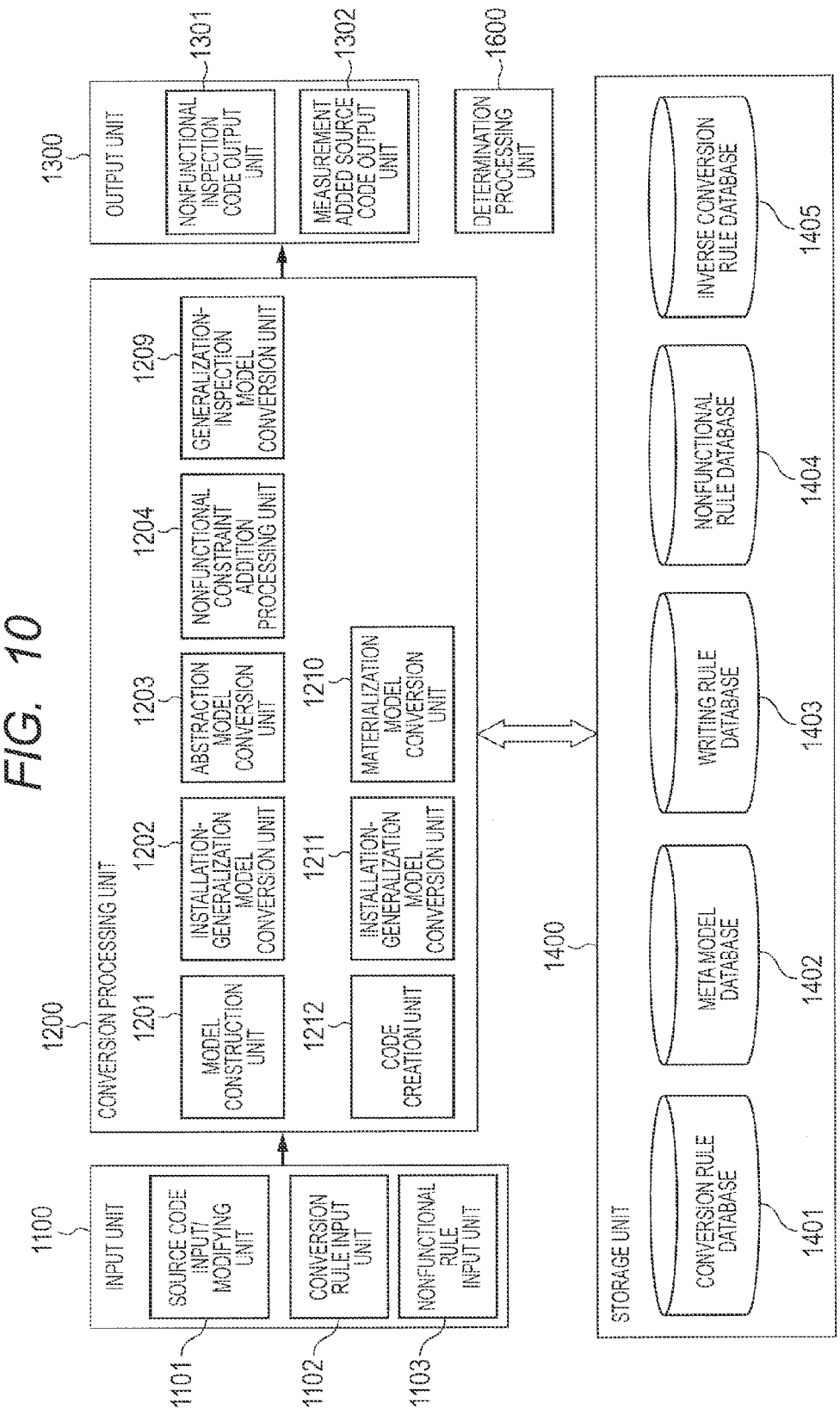
FIG. 10 is a diagram illustrating a configuration example of the source code conversion apparatus according to the second embodiment.

FIG. 10 is a diagram illustrating a configuration example of the source code conversion apparatus 1000. The input unit 1100 includes a source code input/correction unit 1101, a conversion rule input unit 1102, and a nonfunctional rule input unit 1103. The conversion processing unit 1200 includes a model construction unit 1201, an installation-generalization model conversion unit 1202, an abstraction model conversion unit 1203, a nonfunctional constraint addition processing unit 1204, a generalization-inspection model conversion unit 1209, a materialization model conversion unit 1210, a generalization-installation model conversion unit 1211, and a code generation unit 1212. The output unit 1300 includes a nonfunctional inspection code writing unit 1301 and a measurement added source code output unit 1302. The storage unit 1400 includes a conversion rule database 1401, a meta model database 1402, a writing rule database 1403, a nonfunctional rule database 1404, and an inverse conversion rule database 1405.

The source code conversion apparatus 1000 is implemented as a program that operates on, for example, one computer or a plurality of computers connected through a network. The source code 0001 and the conversion rule set 0002 are input by methods such as, for example, a method of reading from a storage device on the computer and a method of direct input by an input device connected to the computer. Further, the nonfunctional inspection code 0007 and the measurement added source code 0008 are output by, for example, a method of writing in the storage device on the computer and a method of displaying on a display device of the computer. The input unit 1100 receives information regarding the source code 0001 which is data input by the user and information regarding the plurality of conversion rules divided with the fine grade, that is, the "conversion rule set" 0002 and provides the corresponding information to the conversion processing unit 1200. In some embodiments, the input unit 1100 may receive a command associated with driving or controlling of the conversion processing unit and driving or controlling of the output unit, from the user.

Figure 11:
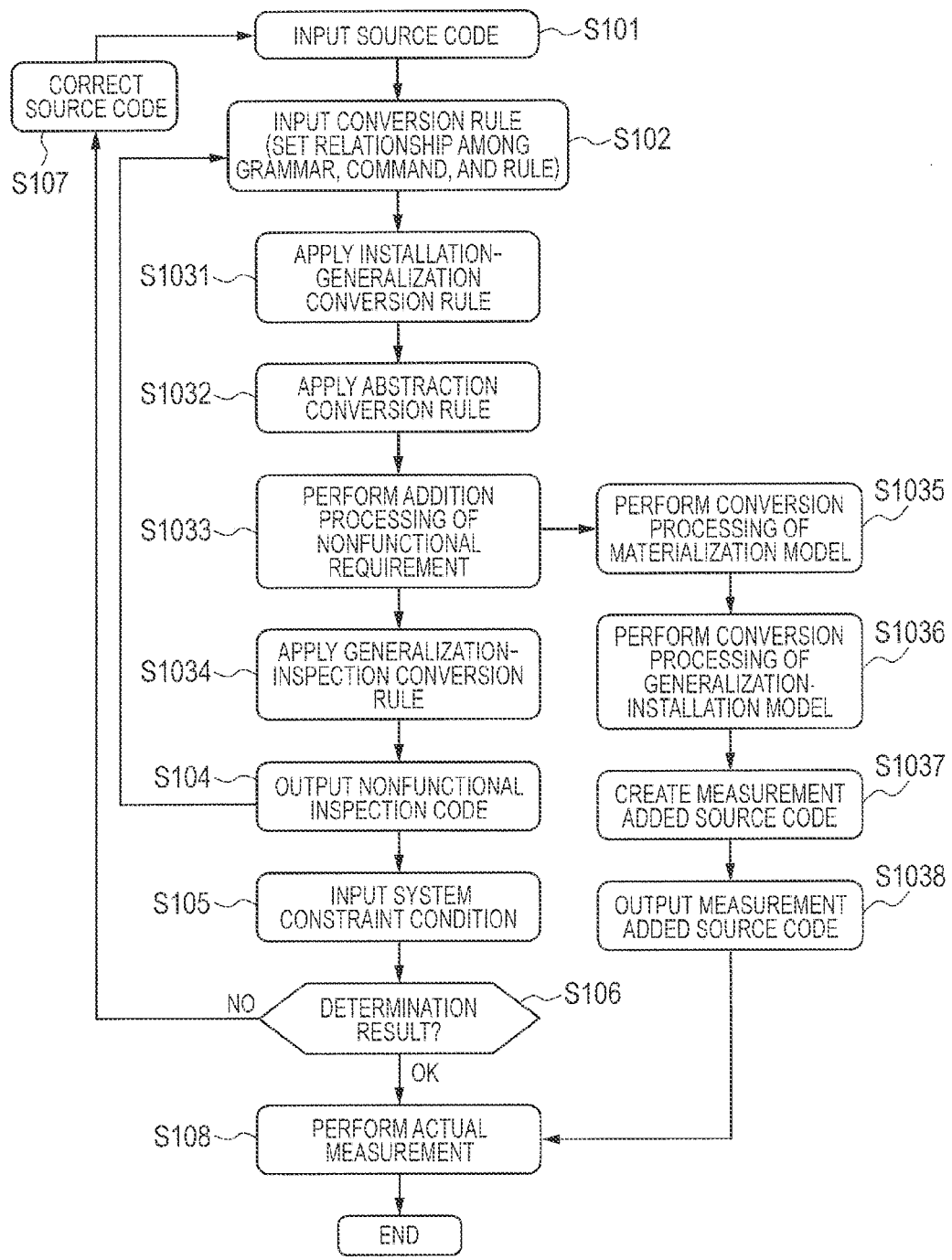
FIG. 11 is a diagram illustrating an example of a processing flow of the source code conversion apparatus according to the second embodiment of the invention.

FIG. 11 is a diagram illustrating an example of a processing flow of the source code conversion apparatus according to the second embodiment of the invention. The information of the source code 0001 from the input unit 1100 and information of the conversion rule set 0002 to be applied to the source code 0001 are provided to the conversion processing unit 1200 (S101 and S102 of FIG. 11), which performs processing (S1031 to S1034 and S104 to S107) of converting the source code 0001 by the conversion rule set 0002 and inverse conversion processing (S1035 to S1038), and provides information of the conversion result and the measurement added source code 0008 added with measurement processing which is appropriate for an abstraction level of the user to the output unit 1300 (S108). The output unit 1300 outputs the nonfunctional inspection code 0007 by using the information on the conversion result provided from the conversion processing unit 1200.

Figure 12:
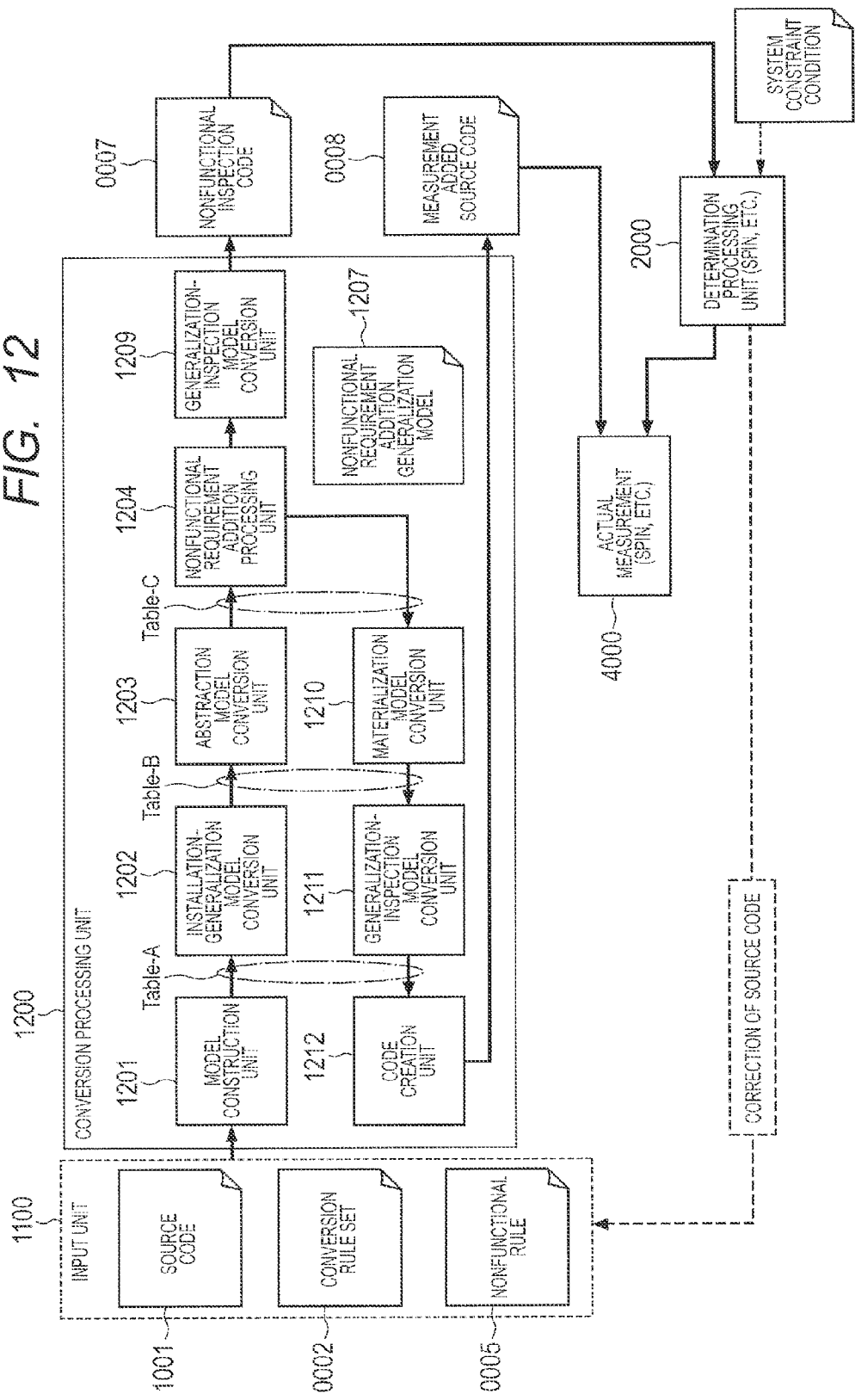
FIG. 12 is a diagram illustrating an operation of the source code conversion apparatus according to the second embodiment.
Figure 13:
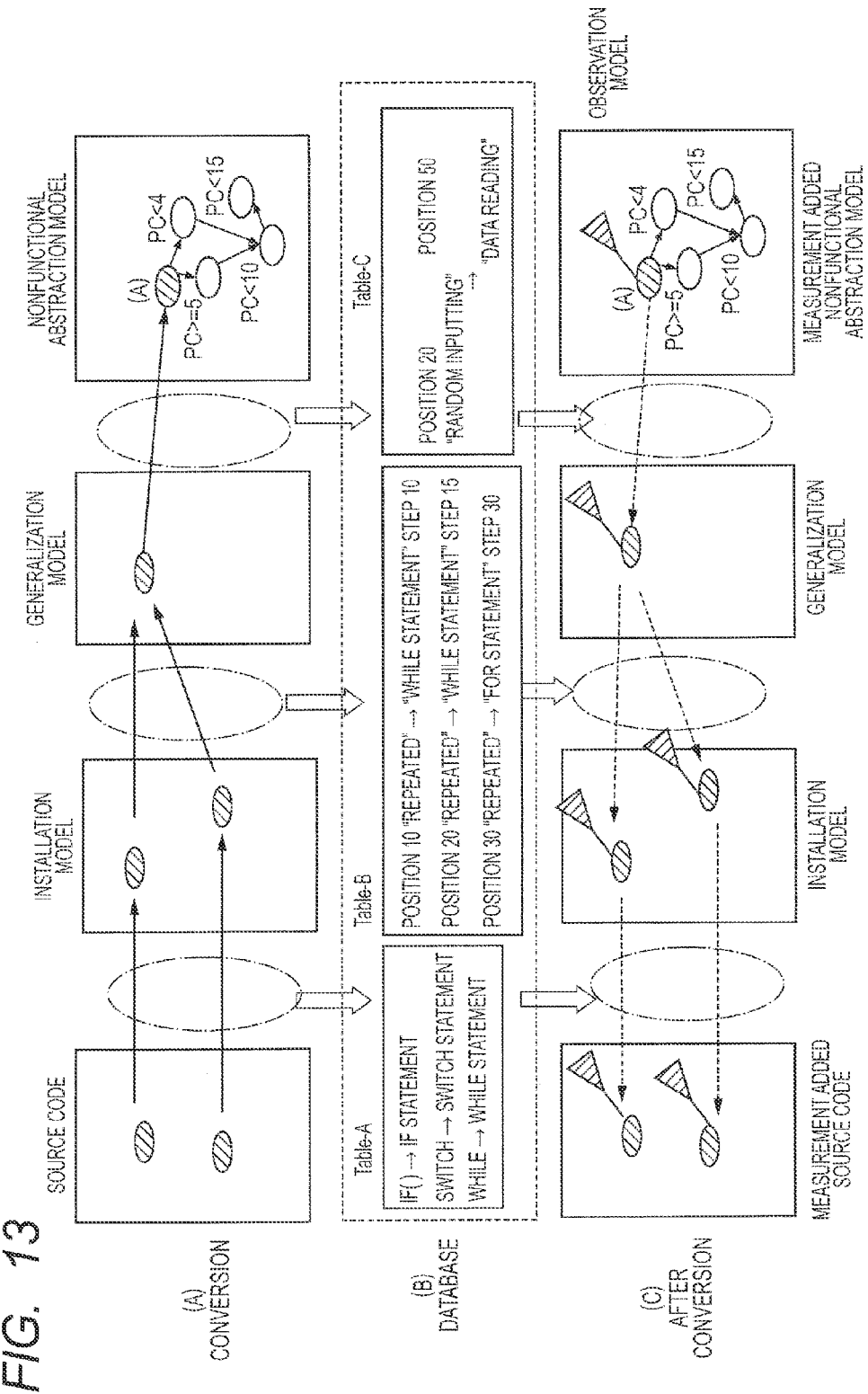
FIG. 13 is a diagram illustrating a configuration example and a function of a source code-installation model conversion correspondence table (Table-A to C).

Hereinafter, referring to FIGS. 12 to 14, a configuration and a function of the conversion processing unit 1200 will be described in detail. First, FIG. 12 is a diagram illustrating an operation of the source code conversion apparatus according to the second embodiment. FIG. 13 is a diagram illustrating a configuration example and a function of a source code-installation model conversion correspondence table (Table-A to C).

In the embodiment, the conversion processing unit 1200 converts source code information 0001 into the generalization model 1207 added with the nonfunctional requirement by model conversion using the meta models and the conversion rules, and outputs the measurement added source code 0008. The model construction unit 1201 receives the source code information from the source code input unit 1101 and converts the received source code information into the installation model 1205 and registers the conversion process in the inverse conversion rule database 1405 as the source code-installation model conversion correspondence table (Table-A). For example, "if ( )"→"if statement", "switch"→"switch statement", and "while"→"while statement" are recorded in the source code-installation model conversion correspondence table (Table-A).

The installation-generalization model conversion unit 1202 extracts the installation-generalization rule from the conversion rule database 1401 and the meta-installation model and the meta-generalization model from the meta model database 1402, converts the installation model into the generalization model, and registers the conversion process in the inverse conversion rule database 1405 as the installation-generalization model conversion correspondence table (Table-B). For example, location 10, "repeated"→"while statement" step 10, location 20, "repeated"→"while statement" step 15, location 30, and "repeated"→"for statement" step 30 are recorded in the source code-installation model conversion correspondence table (Table-B).

The abstraction model conversion unit 1203 extracts the abstraction conversion rule from the conversion rule database 1401 and the meta-generalization model from the meta model database 1402, abstracts the generalization model, and registers the conversion process in the inverse conversion rule database 1405 as the abstraction conversion correspondence table (Table-C). For example, location 20, "random input"→location 50, "data reading" is recorded in the source code-installation model conversion correspondence table (Table-C).

The nonfunctional constraint addition processing unit 1204 extracts the nonfunctional requirement from the nonfunctional rule database 1404 to add the nonfunctional requirement to the model element corresponding to the generalization model and output the model element added with the nonfunctional requirement to the generalization-inspection model conversion unit 1209 and the materialization model conversion unit 1210. The generalization-inspection model conversion unit 1209 extracts the generalization-inspection conversion rule from the conversion rule database, and the meta-generalization model and the meta-inspection model from the meta model database, and converts the generalization model into the inspection model. The materialization model conversion unit 1210 acquires the abstraction conversion correspondence table (Table-C) from the inverse conversion rule database 1405 and materializes the abstracted generalization model in accordance with the correspondence table. The generalization-installation model conversion unit 1211 acquires the installation-generalization model conversion correspondence table (Table-B) from the inverse conversion rule database 1405 and inversely converts the generalization model into the installation model in accordance with the correspondence table. The code generation unit 1212 acquires the source code-installation model conversion correspondence table (Table-A) from the inverse conversion rule database 1405 to convert the installation model into the measurement added source code 0008 in accordance with the correspondence table and output the measurement added source code 0008 to the source code output unit 1302. The inspection code output unit converts the inspection model into the nonfunctional inspection code 0007 by using the meta inspection model, and the inspection code writing rule acquired from the writing rule database 1403 of the storage unit 1400. For example, in the case where UPPAAL is used as the model checking tool, since a model may be directly input, the model is written without conversion processing. The source code output unit outputs the input measurement added source code to the outside of the system. For example, the source code is stored in an external storage medium or displayed in the display.

Figure 14:
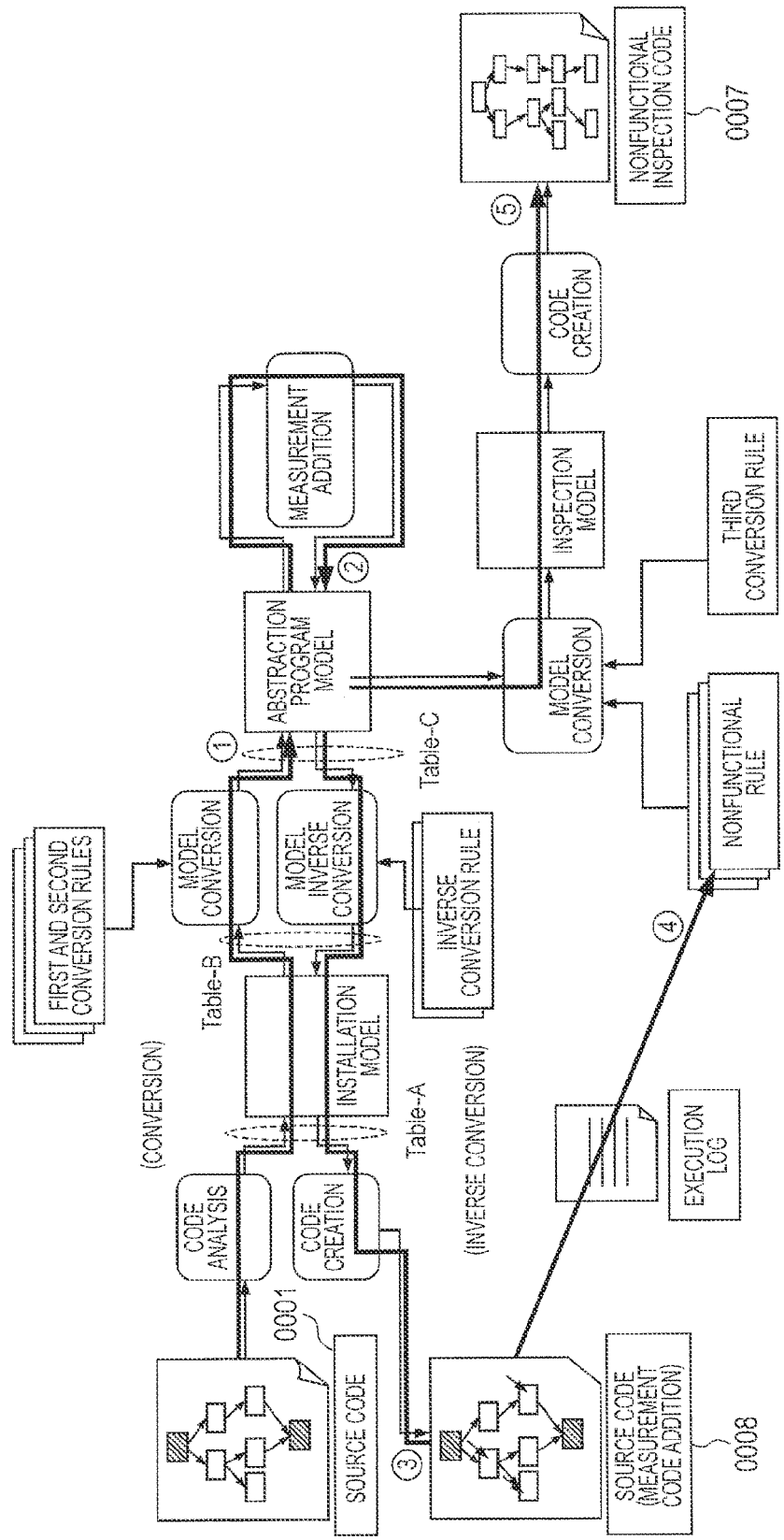
FIG. 14 is a diagram illustrating a source code conversion procedure according to the second embodiment.
Figure 15:
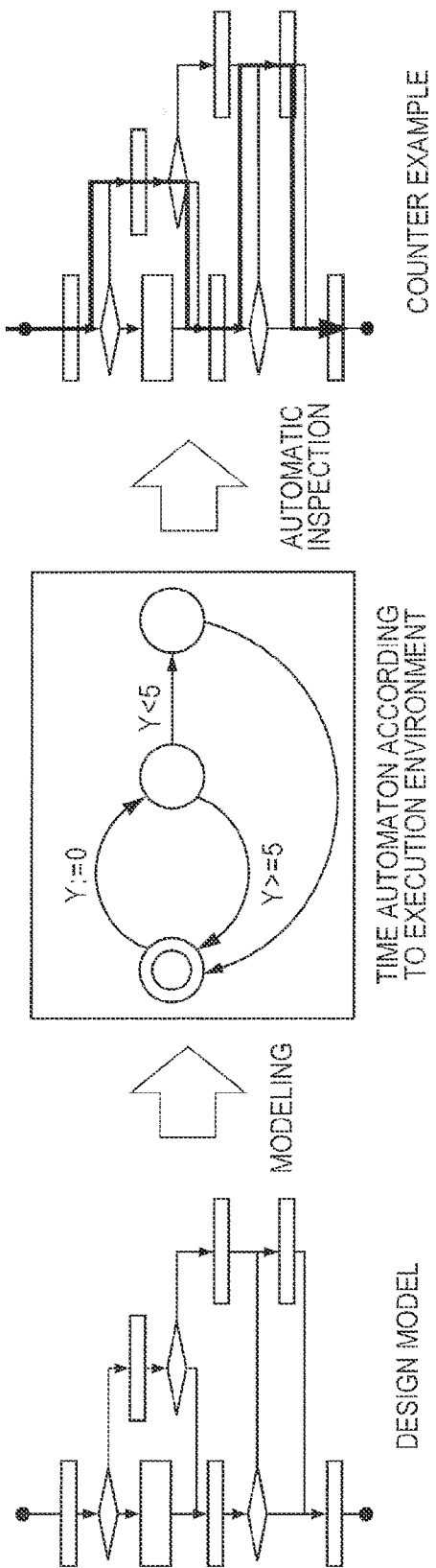
FIG. 15 is a diagram illustrating an example of a source code conversion apparatus in the related art.

Next, FIG. 14 is a diagram illustrating a source code conversion procedure. According to an automatic generation technique using the nonfunctional rule, for example, a time conversion rule by the invention, (1) an abstraction program model is converted up to an abstraction level to be validated, (2) a measurement check is added to an abstraction program model to be inspected, and (3) a measurement code is embedded in a part which is converted into the source code in accordance with the inverse inversion rule, and measured and checked and becomes the measurement code added source code. Further, (4) an execution time is measured by a real environment and the time conversion rule is generated. (5) The nonfunctional inspection code 0007 is generated by using the generated time conversion rule. In addition, as described in FIGS. 12 and 13, the measurement code added source code may be generated after granting the time conversion rule.

As a result, an observation probe depending on the change of the abstraction level by the user may be automatically inserted into a source code of actual software and a nonfunction at the abstraction level selected by the user, for example, a problem that it is difficult to observe an execution processing time is solved.

That is, according to the embodiment, the change of abstraction level by the user is automatically implemented by an operation of selecting and inputting a plurality of different conversion rules corresponding to a source code to be inspected. Further, actual measurement data in which a theoretical location and an actual location of software correspond to each other one to one in accordance with the abstraction level selected by the user may be observed.

REFERENCE SIGNS LIST

0001 Source code
0002 Conversion rule
0003 Meta model
0004 Writing rule
0005 Nonfunctional rule
0006 Nonfunctional inspection code
0007 Nonfunctional inspection code
0008 Measurement added source code
1000 Source code inspection apparatus
1001 Source code information
1002 Meta installation model
1003 Meta generalization model
1004 Meta inspection model
1005 Installation-generalization conversion rule
1006 Abstraction conversion rule
1007 Generalization-inspection conversion rule
1008 Inspection model
1009 Inspection code
1100 Input unit
1101 Source code input unit
1102 Conversion rule input unit
1200 Conversion processing unit
1201 Model construction unit
1202 Installation-generalization model conversion unit
1203 Abstraction model conversion unit
1204 Nonfunctional constraint addition processing unit
1209 Generalization-inspection model conversion unit
1205 Installation model
1206 Generalization model
1300 Output unit
1301 Inspection code writing unit
1400 Storage unit
1401 Conversion rule database
1402 Meta model database
1403 Writing rule database
1404 Nonfunctional rule database
1500 Control unit
2000 Model inspection tool
4000 Actual measurement apparatus
S101 Source code input step
S102 Conversion rule input step
S103 Conversion rule application step
S104 Inspection code output step

The invention claimed is:

1. A method of checking a source code, comprising:
converting the source code to an installation model by a model construction unit;
converting the installation model to a generalization model by an installation-generalization model conversion unit, wherein the generalization model includes generalized program information which does not depend on a language of the source code;
converting the generalization model to an abstraction model by an abstraction model conversion unit, wherein the abstraction model is in an intermediate format that does not depend on the language of the source code;
converting the abstraction model to a nonfunctional constraint additional generalization model by a nonfunctional constraint addition processing unit, wherein the nonfunctional constraint addition processing unit adds a nonfunctional constraint to each function of the abstraction model based on a nonfunctional rule;
converting the nonfunctional constraint additional generalization model to an inspection model by a generalization-inspection model conversion unit, wherein the inspection model is in a language of a model checking tool;
converting the inspection model to an inspection code by an inspection code writing unit; and
checking the inspection code by the model checking tool to determine whether the source code is validated.

2. The method of claim 1, wherein the installation-generalization model conversion unit applies a conversion rule to convert the installation model to the generalization model.

3. The method of claim 1, wherein the abstraction model conversion unit applies an abstraction conversion rule to convert the generalization model to the abstraction model.

4. The method of claim 1, wherein the nonfunctional constraint includes a temporal constraint or a capacitive constraint.

5. The method of claim 1, wherein the generalization-inspection model conversion unit applies a generalization-inspection conversion rule to convert the nonfunctional constraint additional generalization model to the inspection model.

6. The method of claim 1, further comprising:
adding an observation point to the abstraction model by the abstraction model conversion unit.

7. The method of claim 1, further comprising:
adding a validation requirement to the abstraction model by the abstraction model conversion unit.

8. A system for checking a source code, comprising:
a model construction unit configured to convert the source code to an installation model;
an installation-generalization model conversion unit configured to convert the installation model to a generalization model, wherein the generalization model includes generalized program information which does not depend on a language of the source code;

an abstraction model conversion unit configured to convert the generalization model to an abstraction model, wherein the abstraction model is in an intermediate format that does not depend on the language of the source code;

a nonfunctional constraint addition processing unit configured to convert the abstraction model to a nonfunctional constraint additional generalization model by adding a nonfunctional constraint to each function of the abstraction model based on a nonfunctional rule;

a generalization-inspection model conversion unit configured to convert the nonfunctional constraint additional generalization model to an inspection model, wherein the inspection model is in a language of a model checking tool;

an inspection code writing unit configured to convert the inspection model to an inspection code; and the model checking tool is further configured to check the inspection code to determine whether the source code is validated.

9. The system of claim 8, wherein the installation-generalization model conversion unit is further configured to apply a conversion rule to convert the installation model to the generalization model.

10. The system of claim 8, wherein the abstraction model conversion unit is further configured to apply an abstraction conversion rule to convert the generalization model to the abstraction model.

11. The system of claim 8, wherein the nonfunctional constraint includes a temporal constraint or a capacitive constraint.

12. The system of claim 8, wherein the generalization-inspection model conversion unit is further configured to apply a generalization-inspection conversion rule to convert the nonfunctional constraint additional generalization model to the inspection model.

13. The system of claim 8, wherein the abstraction model conversion unit is further configured to add an observation point to the abstraction model by the abstraction model conversion unit.

14. The system of claim 8, wherein the abstraction model conversion unit is further configured to add a validation requirement to the abstraction model by the abstraction model conversion unit.

* * * * *